(12) United States Patent
Dayton

(10) Patent No.: US 7,854,469 B2
(45) Date of Patent: Dec. 21, 2010

(54) SYSTEM FOR REDUCING AERODYNAMIC DRAG ON VEHICLES

(76) Inventor: Roderick M Dayton, 17212 Misty Lake Dr., Strongsville, OH (US) 44136

(*) Notice: Subject to any disclaimer, the term of this patent is extended or adjusted under 35 U.S.C. 154(b) by 0 days.

(21) Appl. No.: 12/435,681

(22) Filed: May 5, 2009

(65) Prior Publication Data

US 2010/0117396 A1 May 13, 2010

(30) Foreign Application Priority Data

Nov. 12, 2008 (CA) .................................. 2642163

(51) Int. Cl.
*B62D 37/02* (2006.01)
(52) U.S. Cl. .................................. 296/180.4; 296/180.1
(58) Field of Classification Search .............. 296/180.1, 296/180.4
See application file for complete search history.

(56) References Cited

U.S. PATENT DOCUMENTS

| | | |
|---|---|---|
| 3,524,672 A | 8/1970 | Rawlings |
| 4,262,953 A | 4/1981 | McErlane |
| 4,421,354 A | 12/1983 | Lemaster |
| 4,486,046 A | 12/1984 | Whitney et al. |
| 4,585,262 A | 4/1986 | Parks |
| 4,640,541 A | 2/1987 | FitzGerald et al. |
| 4,659,130 A | 4/1987 | Dimora et al. |
| 4,902,067 A | 2/1990 | Sakai et al. |
| 5,280,990 A | 1/1994 | Rinard |
| 5,375,882 A | 12/1994 | Koch, III |
| 6,079,769 A | 6/2000 | Fannin et al. |
| 6,644,700 B2 | 11/2003 | Ito et al. |
| 6,685,256 B1 | 2/2004 | Shermer |
| 6,837,536 B1 | 1/2005 | Schwartz |
| 6,974,178 B2 * | 12/2005 | Ortega et al. ............. 296/180.1 |
| 7,040,690 B2 | 5/2006 | Soja et al. |

(Continued)

FOREIGN PATENT DOCUMENTS

CA 2642163 1/2009

(Continued)

OTHER PUBLICATIONS

PCT/US2009/034662 (Publication No. WO2009105631) International Search Report.

(Continued)

*Primary Examiner*—Joseph D Pape
(74) *Attorney, Agent, or Firm*—Pearne & Gordon LLP

(57) ABSTRACT

An apparatus is provided for reducing aerodynamic drag experienced by an over-the-road vehicle while underway. A frame assembly including a fastening fixture couples the apparatus to the vehicle, and a first airfoil including a first outward air deflecting surface deflects a portion of the airflow directed toward a first tire laterally outward toward an externally exposed side of the first tire. A second airfoil including a second outward air deflecting surface deflects a portion of the airflow directed toward a second tire laterally outward toward an externally exposed side of the second tire. The first and second airfoils are spaced laterally apart from each other when coupled to the vehicle by the frame assembly to define an aperture between the first and second airfoils through which at least a portion of the airflow directed toward the axle assembly is to pass while the vehicle is underway.

17 Claims, 10 Drawing Sheets

U.S. PATENT DOCUMENTS

| | | | |
|---|---|---|---|
| 7,055,891 | B2 | 6/2006 | Jungert |
| 7,093,889 | B2 | 8/2006 | Graham |
| 7,240,958 | B2 | 7/2007 | Skopic |
| 7,578,541 | B2 | 8/2009 | Layfield et al. |
| 2005/0146161 | A1 | 7/2005 | Uland |
| 2006/0252361 | A1 | 11/2006 | Henderson, II |
| 2008/0303309 | A1 | 12/2008 | Dayton |

FOREIGN PATENT DOCUMENTS

| | | | |
|---|---|---|---|
| DE | 37 12 048 | * | 10/1988 |
| DE | 10315885 | A1 | 11/2004 |
| FR | 2538767 | A1 | 7/1984 |
| JP | 2007253657 | | 10/2007 |
| JP | 2008013013 | | 1/2008 |
| WO | 2009105631 | | 8/2009 |

OTHER PUBLICATIONS

Canadian Office action dated Jan. 29, 2009 for Canadian application 2,642,163 to Dayton.

Response to Canadian Office action dated Jan. 29, 2009 for Canadian application 2,642,163, filed with the Canadian Intellectual Property Office on Jul. 29, 2009.

Notice of Allowance, Canadian Intellectual Property Office dated Dec. 7, 2009, for Application No. 2,642,163 (1 page).

* cited by examiner

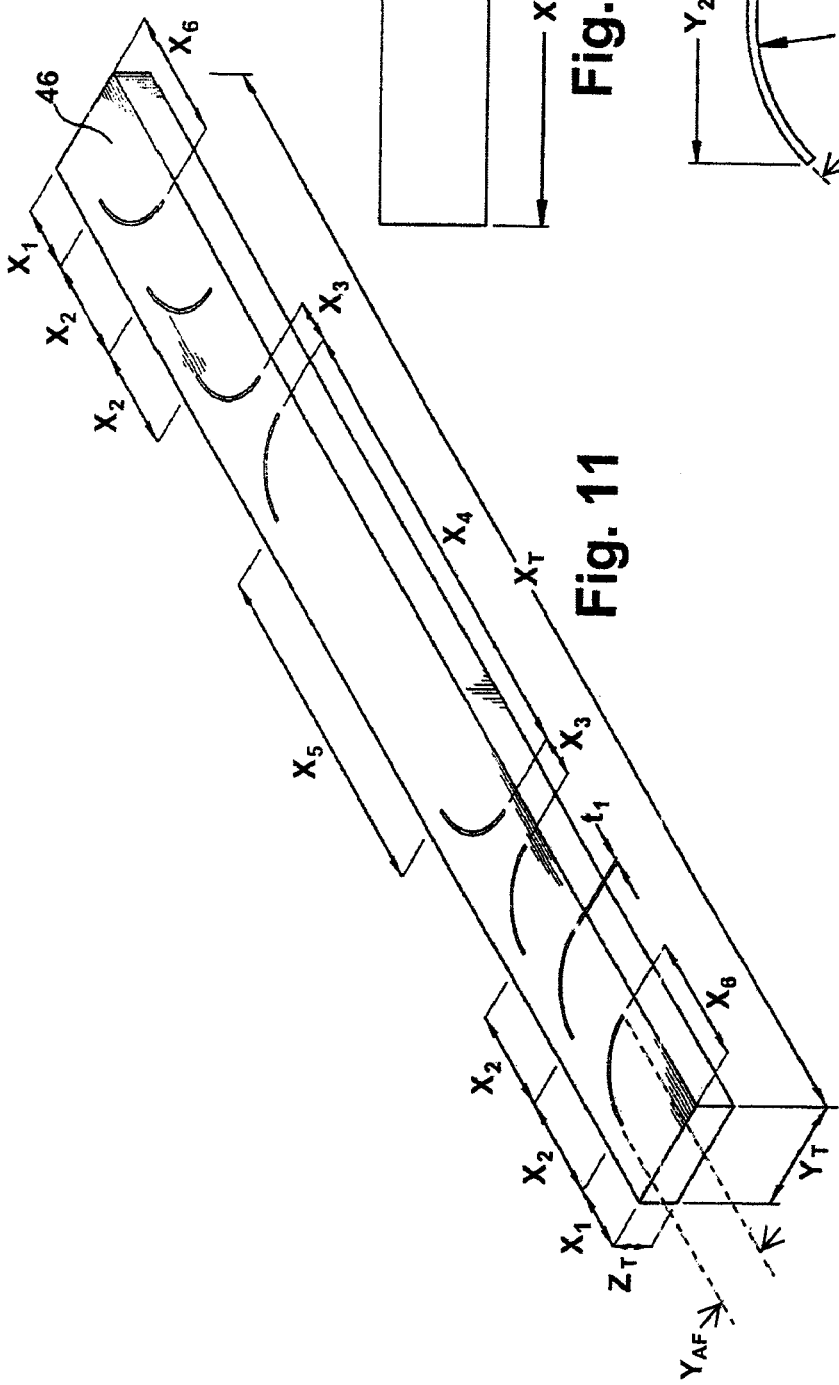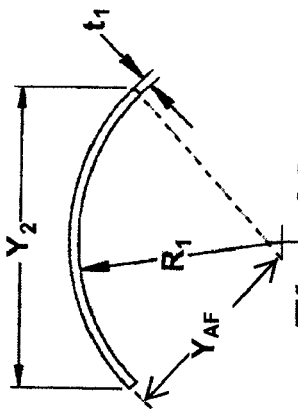

SYSTEM FOR REDUCING AERODYNAMIC DRAG ON VEHICLES

This application claims the benefit of Canadian application serial number 2,642,163, filed on Nov. 12, 2008.

TECHNICAL FIELD

The invention relates generally to the field of over-the-road vehicles and more particularly to vehicle components directed at reducing the aerodynamic drag experienced by over-the-road vehicles while underway.

BACKGROUND

Fuel efficiency is of increasing importance to the operation of land vehicles in light of rising fuel prices and ecological concerns. This is especially true in the field of over-the-road highway trucks. These trucks travel great distances at relatively high speeds. Any improvement that reduces the aerodynamic drag on the truck at highway speeds can have a significant impact on the fuel economy of the truck.

Typically, over-the-highway trucks include a number of body components aimed at reducing drag and improving fuel economy. For example, some trucks have fairings installed above the roof of the cab to direct air more smoothly over the transition between the cab and the trailer. The design of hoods and fenders focuses on creating an aerodynamic surface. Another component that is often used to reduce drag is the air dam, which is a deflective shield installed between the frame of the truck and the ground. An air dam routes air around the truck's bottom smoothly to improve aerodynamic performance.

While devices such as air dams and fairings are useful to route air around portions of the truck to improve fuel efficiency, they form a relatively large "sail" surface that is exposed to the airflow directed toward the truck. This sail surface limits the gain in fuel efficiency that can be realized by such conventional devices.

Accordingly, there is a need in the art for a method and apparatus for minimizing the aerodynamic drag experienced by an over-the-road vehicle while underway. The method and apparatus can optionally minimize the surface area exposed approximately perpendicularly to the airflow, and gradually deflect portions of the airflow directed toward an axle assembly of the vehicle in a plurality of directions around the axle assembly.

SUMMARY

One aspect of the present disclosure comprises an apparatus for reducing aerodynamic resistance in an over the road vehicle. The apparatus includes an attachment fixture having first and second ends. The first end connects the apparatus to the vehicle. The apparatus further comprises a horizontal support rail fixedly attached to the second end of the attachment fixture. A plurality of vertical airfoils are disposed within the horizontal support rail. The plurality of vertical airfoils manipulate the airflow outward and inward with respect to a central longitudinal axis of the vehicle. The apparatus further comprises a plurality of horizontal airfoils disposed between the first and second ends of the attachment fixture. The plurality of horizontal airfoils manipulate the airflow downward such that it passes under a lateral axis of the vehicle.

According to another aspect, the present application involves an apparatus for reducing aerodynamic drag experienced by an over-the-road vehicle while underway. The apparatus includes a frame assembly comprising a fastening fixture for coupling the apparatus to the vehicle, and a first airfoil to be coupled to said frame assembly in a position forward of a first tire of an axle assembly provided to the vehicle to be exposed to an airflow directed toward the first tire while the vehicle is underway. The first airfoil includes a first outward air deflecting surface for deflecting a portion of the airflow directed toward the first tire laterally outward toward an externally exposed side of the first tire. The apparatus also includes a second airfoil to be coupled to said frame assembly in a position forward of a second tire supported at an opposite lateral side of the axle assembly relative to the first tire to be exposed to an airflow directed toward the second tire while the vehicle is underway. The second airfoil includes a second outward air deflecting surface for deflecting a portion of the airflow directed toward the second tire laterally outward toward an externally exposed side of the second tire. The first and second airfoils are spaced laterally apart from each other when coupled to said vehicle by said frame assembly to define an aperture between the first and second airfoils through which at least a portion of the airflow directed toward the axle assembly is to pass while the vehicle is underway.

According to another aspect, the outward air deflecting surface of each of the first and second airfoils can optionally not be flat, but instead, independently selected as a concave outward surface or a convex outward surface. According to such an aspect, the first and second airfoils can each extend a distance along a longitudinal axis of the vehicle that is substantially less than an overall length of the vehicle. For example, the first and second airfoils can optionally extend less than three-fourths (¾) the length of the trailer. According to another example, the first and second airfoils can optionally extend less than one half (½) the length of the trailer. According to yet another example, the first and second airfoils can optionally extend less than one third (⅓), or even less than one fourth (¼) the length of the trailer when installed.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts throughout the drawings and in which:

FIG. 11 is a perspective view of an air manipulator assembly support frame constructed in accordance with one embodiment of the present disclosure;

FIG. 12 is a top view of an airfoil in a relatively flat orientation;

FIG. 13 is end view of an airfoil in an arcuate orientation for insertion into the air manipulator assembly of FIG. 6;

DETAILED DESCRIPTION

Figure 1:
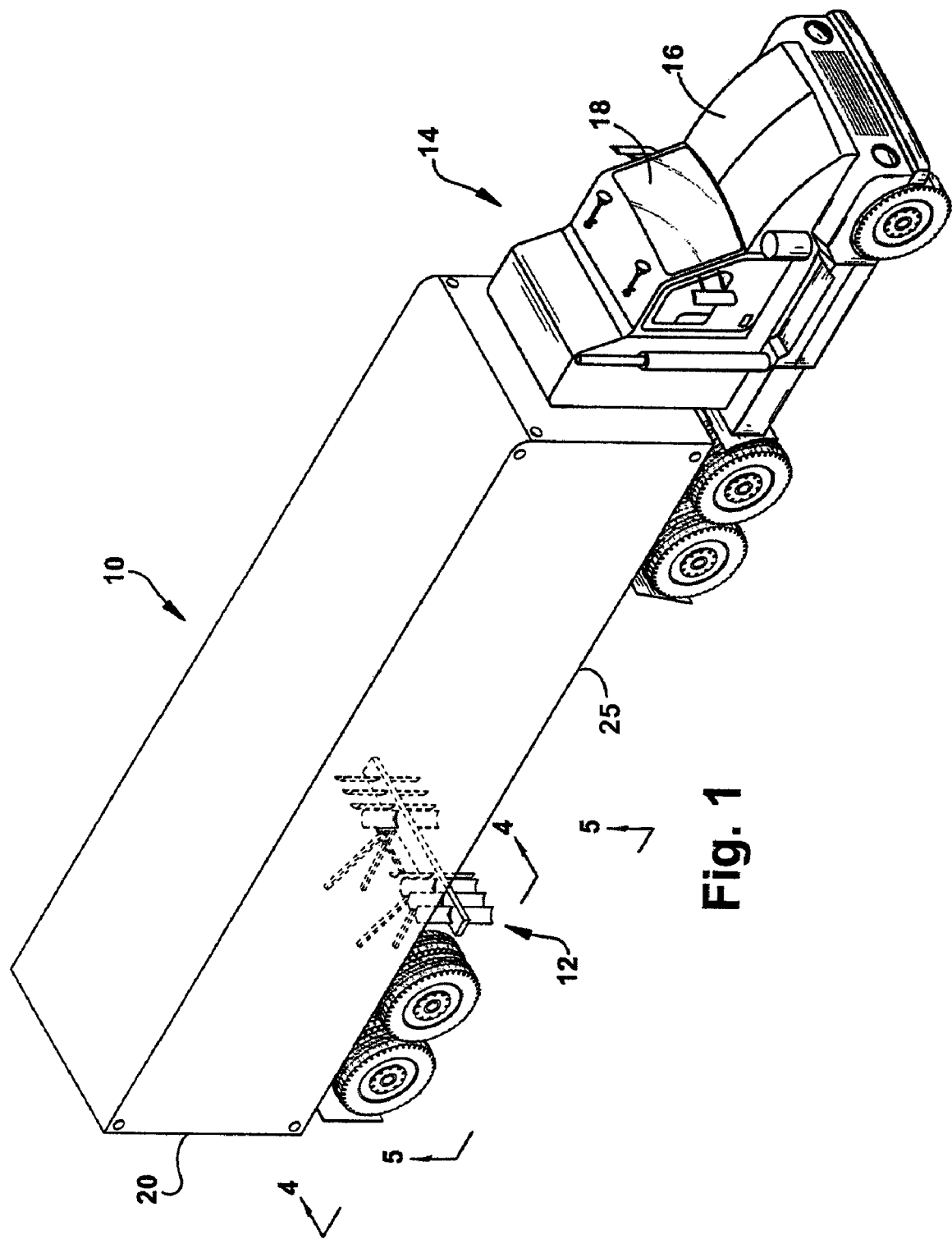
FIG. 1 is a perspective view of an over-the-road vehicle having an air manipulating assembly constructed in accordance with one embodiment of the present disclosure.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Illustrated in FIG. 1 is an over-the-road vehicle 10, and more specifically a Class 8 tractor-trailer having an air manipulator assembly 12 for reducing the aerodynamic resistance of the vehicle while the vehicle is in motion. The vehicle 10 includes a tractor 14 having an engine compartment 16 and cab 18 for situating the driver during operation of the vehicle. A trailer 20 including a bottom platform 25 for supporting cargo and otherwise adapted for carrying cargo is connected to the tractor 14.

Figure 2:
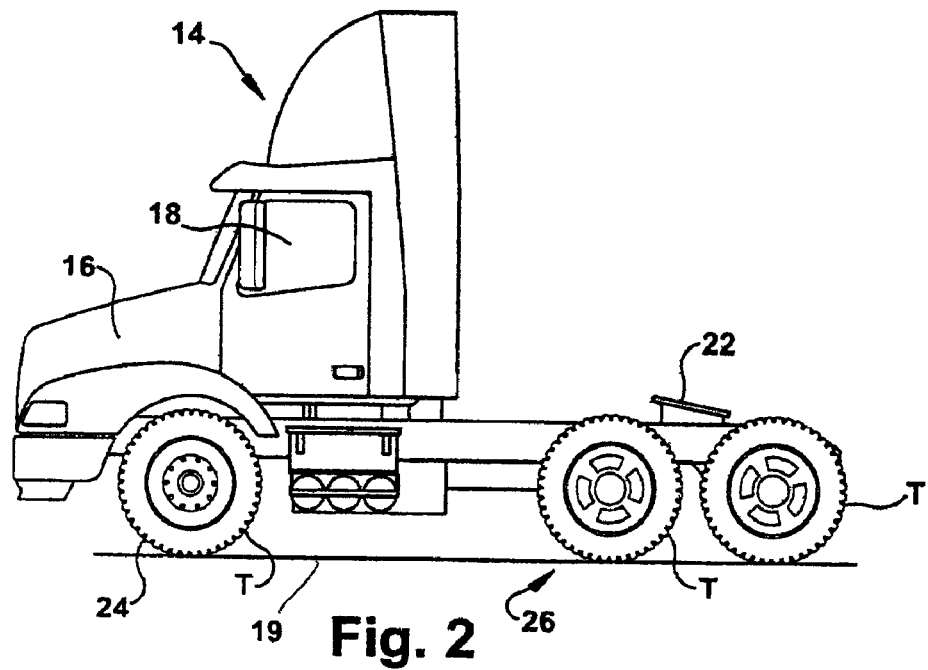
FIG. 2 is a side view of the cab assembly of the over-the-road vehicle constructed in FIG. 1.

Illustrated in FIG. 2 is the tractor 14 in a detached state from the trailer 20 of FIG. 1. A hitch 22 at the rear of the tractor 14 is used for attaching the tractor with the trailer 20. The tractor 14 further includes a front axle assembly 24 and a rear axle assembly 26. When the trailer 20 is connected to the tractor 14, a forward end 28 of the trailer is supported over the tractor's rear axle assembly 26. A rearward end 30 (FIG. 3) of the trailer 20 is supported above the roadway surface by a trailer axle assembly 32. Each of the axle assemblies, namely 24, 26, and 32 includes a corresponding pair of tires (T) that are typically in rolling contact during operation of the vehicle 10 with the road or ground. As used herein, "axle assembly" includes any combination of wheels, tires, axles, struts, shocks, springs, control arms, etc., or any portions thereof, attached to the vehicle 10, tractor 14, and/or trailer 20. To clearly illustrate aspects of the present invention below an axle assembly 32 comprising an axle 35, a tire 37 rotatably coupled adjacent to each opposite end of the axle 35, and a structural support 41 for coupling the axle to the trailer 20 will be used as an illustrative example.

The embodiment of the vehicle 10 described above with reference to FIGS. 1 and 2 is what is commonly referred to as a tractor-trailer arrangement including a tow vehicle in the form of the tractor 14 that is separable from the trailer 20. Different trailers 20 can be selectively coupled to the tractor 14 as desired to allow the tractor 14 to transport different cargo payloads without the down time required to unload and reload the trailer 20. Instead, a trailer 20 can be pre-loaded with the payload to be transported while awaiting the arrival of the tractor 14. The tractor 14 and trailer 10 are provided with a releasable coupling fixtures such as a generally U-shaped hitch 22 provided to the tractor 14 and a conventional kingpin suspended from the trailer 20. The cooperation between such coupling fixtures allows the trailer 20 to be releasably secured to the tractor 14 and pivot as the vehicle 10 navigates turns while underway.

The present invention also includes other embodiments of the vehicle 10 that include a trailer 20 affixed to the secured to the tractor 14 in a fixed relationship by a coupling fixture. For example, a vehicle 10 commonly referred to as a "box truck" also includes a rear axle assembly 32 such as that shown in FIG. 3, but the trailer 20 portion is bolted, welded or otherwise permanently secured to the tractor 14 with any other coupling fixture. As such, the connection facilitated by the coupling fixture for such embodiments does not pivot as the vehicle 10 navigates turns while underway. But regardless of the embodiment of the vehicle 10, the manipulator assembly 12 can be coupled to any portion of the vehicle 10 such as the tractor 14; the trailer 20; portions thereof such as the chassis and axle assembly 32 of the tractor 14 and trailer 20, and any other suitable structure. For the sake of clarity, however, the air manipulator assembly 12 will be described below with reference to the tractor-trailer embodiment of the vehicle 10.

By "underway" it is meant that the vehicle 10 is traveling in a forward direction such as when the vehicle is traveling along an interstate highway when transporting cargo supported by the trailer from an origination location to a desired destination. The airflow described herein is the ambient air passing by the vehicle 10 while underway. The airflow directed toward the tires or other portion of the axle assembly 32 is traveling generally towards the tires or other portion of the axle assembly 32 along a path that would lead to the tire or other portion if followed unobstructed. The airflow is represented in the figures by bold arrows such arrows "O" and "I" shown in FIG. 5, for example.

The air manipulator assembly 12 reduces the aerodynamic resistance, incident pressure, and pressure drag experienced by the vehicle 10 by directing at least a portion of the airflow that occurs while the vehicle 10 is in motion. The portion of the airflow is directed by the air manipulator assembly 12 in at least one of the following directions: around, through and under the trailer axle assembly 32. As a result of attaching the air manipulator assembly 12 to the vehicle 10, a reduction in fuel consumption is experienced during operation of the vehicle 10 relative to operation of the vehicle 10 without the air manipulator assembly 12.

Figure 3:
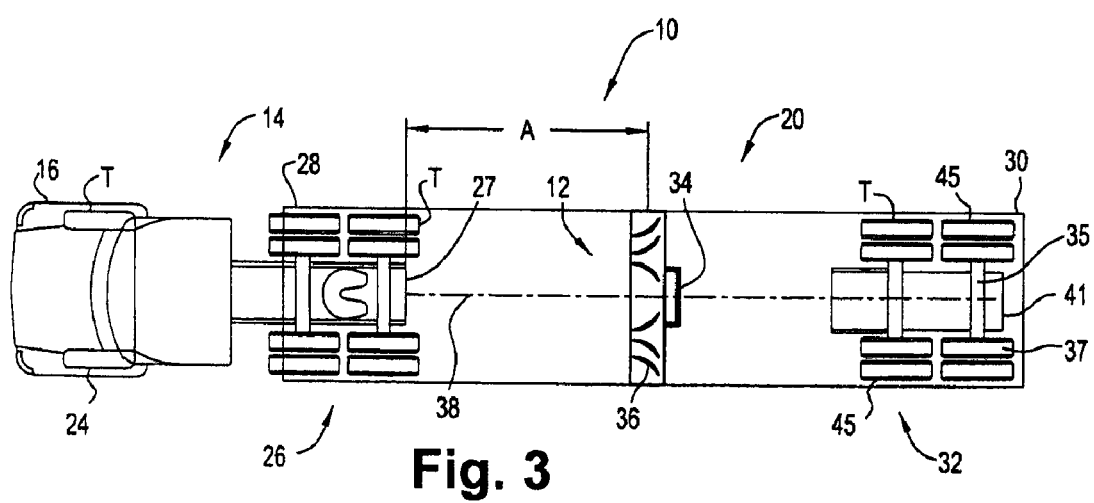
FIG. 3 is a bottom view of the over-the-road vehicle constructed in FIG. 1.

Referring once again to FIG. 3, the air manipulator assembly 12 is coupled to the trailer 20 at a location forward, or upwind of the trailer axle assembly 32. As shown in the embodiment of FIG. 3, the air manipulator assembly 12 is suspended from the trailer 20 at a location separated from a rearward end 27 of the tractor 14 by a predetermined distance A along a longitudinal axis 38 of the trailer 20. The predetermined distance A is the distance from the rearward end 27 of the tractor 14 to a central axis 21 (FIG. 8) along which a midpoint of each vertical airfoil 36 in a direction parallel to the longitudinal axis 38 is aligned. The predetermined distance A can be chosen to minimize the aerodynamic drag experienced by the vehicle 10 while underway for the particular vehicle 10 configuration. However, according to embodiments where the vehicle 10 is configured as a tractor-trailer arrangement as shown in FIG. 3, where the trailer 20 can be approximately fifty three (53') feet in length, for example, the predetermined distance A can be approximately seventeen feet, eight inches (17'8") separating the central axis 21 of the vertical airfoils 36 from the rearward end 27 of the tractor 14. According to other embodiments, the predetermined distance A can be within two (2') feet of seventeen feet, eight inches (17'8") (i.e., 17 ft. 8 inches±2 ft.). According to yet other embodiments, the predetermined distance A can be within one (1') foot of seventeen feet, eight inches (17'8") (i.e., 17 ft. 8 inches±1 ft.).

The air manipulator assembly 12 of FIG. 3 includes a plurality of vertically-oriented airfoils 36, each including a concave outward air-deflecting surface 55 (FIG. 6) or a concave inward air-deflecting surface 61 (FIG. 6), or both. The concave outward air deflecting surface 55 deflects and directs at least a portion of the airflow laterally outward around externally-exposed sides 45 of the tires 37 of the trailer axle assembly 32. Similarly, the concave inward air-deflecting surface 61 deflects and directs at least a portion of the airflow laterally inward between laterally opposed portions of the trailer axle assembly 32. The laterally opposed portions of the trailer axle assembly 32 in FIG. 3 can optionally be the tires 37 rotatably supported on each lateral side of the axle 35.

The embodiment of the air manipulator assembly 12 in FIG. 3 also includes a horizontal airfoil 34 that resembles a vertical airfoil 36 turned on its side, and extending laterally at least partially across a width of the trailer 20 transversely to longitudinal axis 38. The horizontal airfoil 34 includes a concave downward air-deflecting surface 65 (FIG. 7) that deflects and directs at least a portion of the airflow in a generally downward direction, toward a surface of a road 19 (FIG. 4) over which the trailer axle assembly 32 is traveling while the vehicle 10 is underway.

Figure 4:
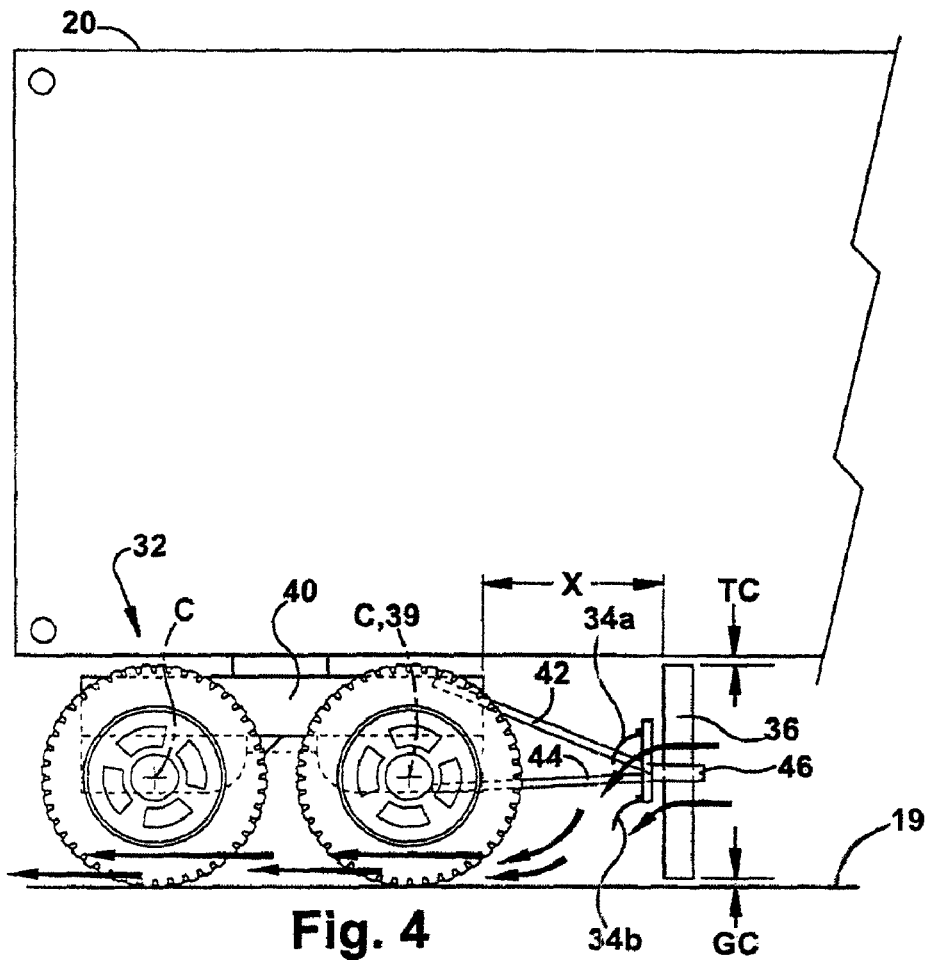
FIG. 4 is a partial view of a side of the trailer assembly viewed along line 4-4 in FIG. 1.
Figure 5:
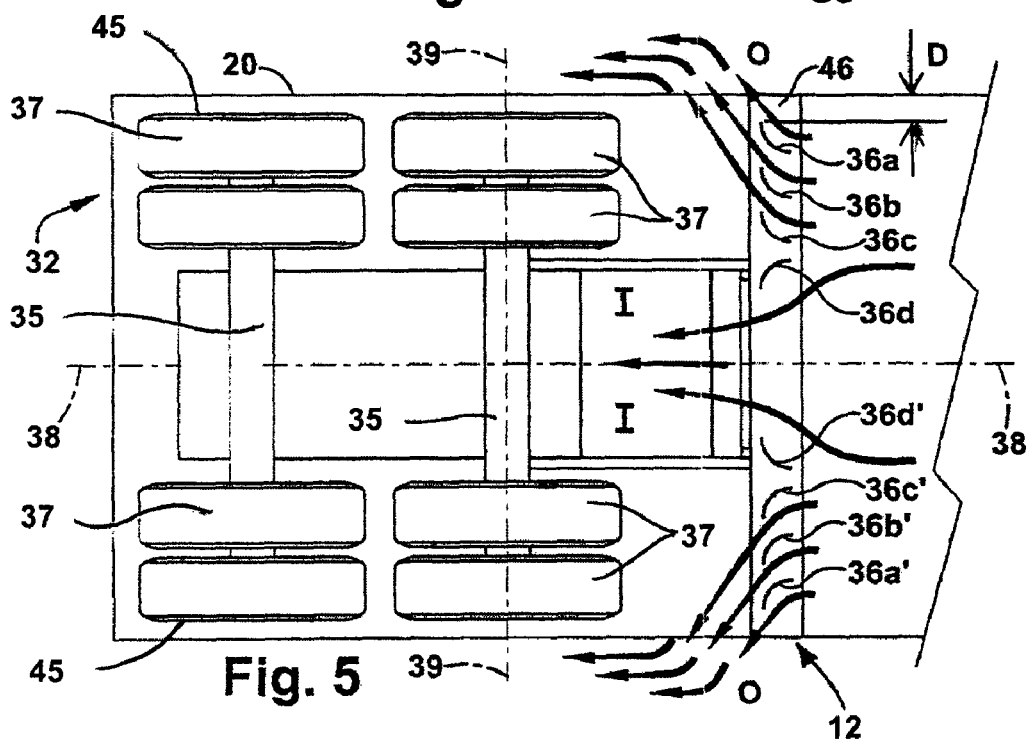
FIG. 5 is a partial bottom view of the trailer assembly viewed along line 5-5 in FIG. 1.

Illustrated in FIG. 4 is a partial side view of the trailer 20 viewed along line 4-4 in FIG. 1, while FIG. 5 is a partial bottom view of the trailer 20 viewed along line 5-5 in FIG. 1. Both FIGS. 4 and 5 illustrate the airflow created by the embodiment of the air manipulator assembly 12 illustrated in FIG. 3. In FIG. 4, two horizontal airfoils, designated individually as an upper horizontal airfoil 34a and a lower horizontal airfoil 34b, direct the portions of the airflow under the trailer axle assembly 32. The portion of the airflow deflected by the concave downward air-deflecting surface 65 (FIG. 7) of the upper and lower horizontal airfoils 34a, 34b is directed in a generally downward direction toward the surface of the road 19 on which the vehicle 10 is traveling while underway. The portion of the airflow deflected by the upper and lower horizontal airfoils 34a, 34b can optionally be deflected a suitable extent to pass between the road 19 and components of the trailer axle assembly 32 such as the axle 35, tires 37, or a combination thereof, for example. So deflecting the portion of the airflow reduces the aerodynamic resistance experienced by the vehicle 10 while underway relative to the aerodynamic resistance experienced by the vehicle 10 without the air manipulator assembly 12.

One or more, or a plurality of vertical airfoils 36, represented individually as vertical airfoils 36a-36d and vertical airfoils 36a'-36d' on opposite lateral sides of the air manipulator assembly 12 in FIG. 5, are to be supported upstream of the axle assembly 32 within the airflow directed toward the axle assembly 32, or a portion thereof, while the vehicle is underway. As discussed above with reference to FIG. 3, the air manipulator assembly can be spaced from the rearward end 27 of the tractor 14 by the predetermined distance A along a longitudinal axis 38 of the trailer 20, or placed immediately upstream of the axle assembly within the airflow as shown in FIG. 5. For the embodiment shown in FIG. 5 a plurality of vertical airfoils 36a-36d and 36a'-36d' are supported upstream of a tire 37 (i.e., the airflow reaches the manipulator assembly before reaching the tire 37 or other portion of the axle assembly 32) rotatably supported adjacent to the opposite ends of the axle 35. The concave outward air-deflecting surface 55 (FIGS. 6 and 8) of the vertical airfoils 36a-36c and the concave outward air-deflecting surface 55 of vertical airfoils 36a'-36c' direct the airflow in a transverse, outward direction designated by arrows "O", generally away from the longitudinal axis 38, and beyond an externally-exposed side 45 of the tire 37.

Similarly, vertical airfoils 36d and 36d' each include the concave inward air-deflecting surface 61 (FIG. 6) for directing the airflow in a laterally inward direction indicated by arrows "I" in FIG. 5, generally toward the longitudinal axis 38 and between the tires 37 rotatably coupled to opposite ends of the axle 35 or other laterally opposed components of the trailer axle assembly 32. In addition, at least a portion of the airflow directed laterally inward toward the longitudinal axis 38 by the vertical airfoils 36d and 36d' can optionally also be subsequently directed in a downward direction, generally toward the ground on which the vehicle 10 is traveling while underway, by the horizontal airfoils 34a and 34b. Thus, the portion of the airflow deflected in the laterally inward direction I can pass between the tires 37 at opposite ends of the axle 35, and also under the axle assembly 32 as well as a lateral axis 39 of the axle 35. The configuration of the horizontal 34 and vertical 36 airfoils reduces the aerodynamic resistance, incident pressure, and pressure drag by directing the airflow at least one of: around the trailer axle assembly 32, between laterally opposed portions of the trailer axle assembly 32, and under the trailer axle assembly 32, as illustrated by the air flow lines in FIGS. 4 and 5.

Figure 6:
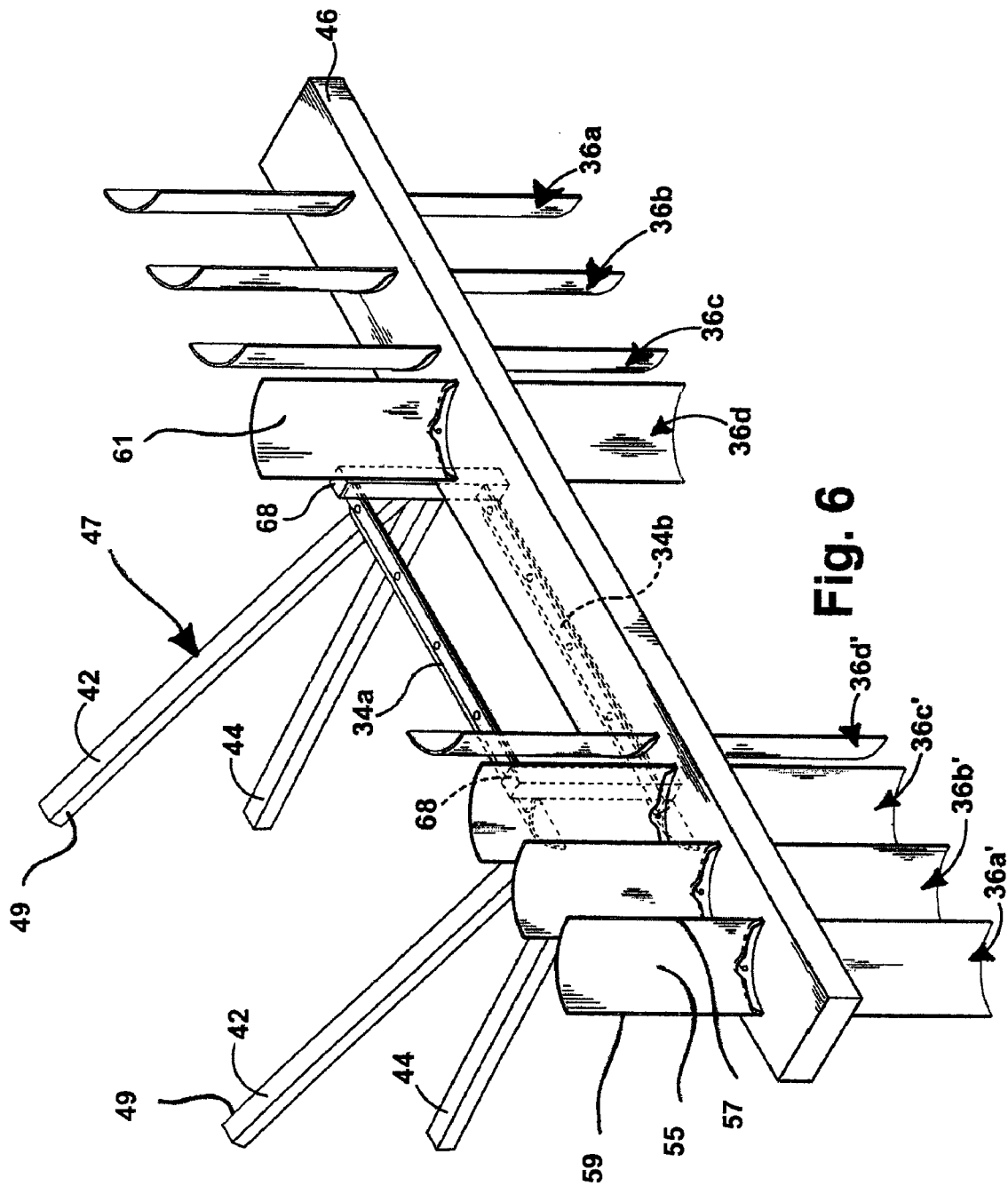
FIG. 6 is a perspective view of an air manipulator assembly constructed in accordance with one embodiment of the present disclosure.

The embodiment of the air manipulator assembly 12 shown in FIG. 6 includes a frame 47 comprising a pair of upper arms 42 and lower arms 44 that can be coupled to the side of a structure coupling the axle 35 to the trailer 20, said structure commonly referred to as a bogie 40. Of course the frame 47 can be coupled to any other portion of the axle assembly 32, trailer 20, or combination thereof by nuts and bolts, clamps or any other suitable mechanical fasteners, or other mounting hardware (not shown). In other illustrative embodiments (not shown), the arms 42 and 44 can be connected to the bogie 40 by a welding operation. The arms 42 and 44 can be constructed of standard two (2") inches by two (2") inches by one-eighth (⅛") inch thick box tubing and are at such a length to position the rear of the vertical airfoils 36 at a distance of approximately forty (40") inches upwind within the airflow from the bogie 40, as illustrated by the dimension X in FIG. 4. In an alternative exemplary embodiment (not shown), the upper and lower arms 42 and 44 are constructed of angle iron or other suitably rigid metallic bodies.

The frame 47 can be attached to a bogie 40 forming a portion of the axle assembly 32, which is located on the undercarriage of the trailer 20. The bogie 40 is part of the structural support 41 (FIG. 16) housing bearings and parts of a suspension system that couple the axle 35 to the trailer 20. Although described below as being attached to the bogie 40, the frame 47 can be coupled to any suitable portion of the trailer 20, such as a portion of the trailer chassis, a pair of trailer rails providing structural support to the platform 25 on which cargo is to be rested, and the like.

The frame 47 can be coupled to the trailer 20 with a clamp, bolts or rivets extending through apertures formed in a fastening fixture portion of the frame 47, welds between a metallic portion of the trailer 20 and the fastening fixture portion of the frame 47, or any other suitable fasteners or mounting hardware (not shown) of a type known in the relevant arts that can cooperate with the fastening fixture portion of the frame 47. The fastening fixture portion of the frame 47 can be any portion of the frame 47 that a fastener such as those mentioned above can cooperate with to secure the frame 47 to the trailer 20. For example, the fastening fixture portion of the frame can include a plate defining apertures through which bolts (not shown) or other such fasteners can extend. A threaded nut (not shown) can cooperate with the bolts extending through both the fastening fixture and a portion of the trailer 20 to couple the air manipulator assembly 12 to the trailer 20. Another example of the fastening fixture includes a metallic surface 49 of the frame 47 that can be welded to a suitable metallic portion of the trailer 20.

The air manipulator assembly 12 can be positioned in such a way to provide approximately three (3") inches of clearance from the bottom of the vertical airfoils 36 and the ground, as illustrated by the dimension "GC" in FIG. 4. Further, the air manipulator assembly 12 can be positioned in such a way to provide approximately two (2") inches of clearance from the top of the vertical airfoils 36 and the bottom of the trailer, as illustrated by the dimension "TC" in FIG. 4. By minimizing the amount of ground clearance GC and trailer clearance TC, the more the aerodynamic resistance is reduced. However, such close proximity of the conventional air dams arrangements with the ground can be prohibitive because of the potential fracture conditions that can occur resulting from collisions with foreign objects on the roadways.

The air manipulator assembly 12 resolves such issue by using a semi-flexible material for the individual airfoils 34, 36. In one example embodiment, the semi-flexible material used to form the airfoils 34, 36 is ethylene propylene diene monomer ("EPDM"), having a durometer range between 85-95 on a Shore A scale. In another example embodiment, the semi-flexible material is fiber-reinforced silicone that allows for color additives, which would aesthetically allow for matching the color of the manipulator assembly 12 with the color of the trim of the vehicle 10. Although it is possible to use other materials to make the airfoils 34, 36, including various polymers, elastomers, plastics, and natural rubbers without departing from the spirit and scope of the claimed invention.

Regardless of the type of material from which the airfoils 34, 36 are fabricated, each airfoil 34, 36 includes a concave outward air-deflecting surface 55, a concave inward air-deflecting surface 61, or both, as shown in FIG. 6. Portions of the airflow deflected in one of the laterally outward, inward or downward directions contact the respective concave air-deflecting surface 55, 61 or 65, and are gradually transitioned from their natural flow pattern generally parallel to the road 19 to their deflected directions. The concave outward, inward and downward air-deflecting surfaces 55, 61, 65 can each be independently selected to be substantially planar, concave, or any other desired shape, or any combination thereof.

Each airfoil 34, 36 includes a leading edge 57 that extends into the airflow while the vehicle 10 is underway, and is upwind relative to a trailing edge 59 of the same airfoils 34, 36. The leading edge 57 of the airfoils 34, 36 minimizes the surface area of the respective airfoil 34, 36 to which the airflow is initially introduced upon reaching the respective airfoil 34, 36, thereby allowing the leading edge 57 to "cut" through the airflow with minimal aerodynamic drag. In other words, the leading edge 57 has a minimal planar surface area that is perpendicular to the direction of the airflow reaching the leading edge 57 while the vehicle 10 is underway. For example, the leading edge 57 can be chisel shaped, such as at a meeting of two planar surfaces; arcuate; or any other suitable shape to minimize the area of the leading edge 57 projecting into the airflow that can act as a sail.

For the embodiments where the vertical airfoils 26 and optional horizontal airfoil 34 include at least one of the concave air deflecting surfaces 55, 61, 65, the leading edge 57 can be oriented such that the portion of the air-deflecting surface 55, 61 or 65 immediately downwind of the leading edge 57 is substantially parallel to the direction of the airflow incident on the airfoil 34, 36 while the vehicle 10 is underway. The concave air-deflecting surfaces 55, 61, 65 gradually transition from being substantially parallel to the direction of the airflow to an orientation suitable to direct the portion of the airflow in the desired laterally inward or outward, or downward directions. According to embodiments of the invention, the concave air-deflecting surface 55 of each laterally inward and laterally outward directing airfoil 36 gradually curves to an extent that a portion of the air-deflecting surface 55 immediately adjacent to the trailing edge 59 forms a suitable angle relative to the longitudinal axis 38 of the trailer 20 to direct the desired portion of the airflow in one or both of the laterally inward and outward directions around the tires, and optionally other portions of the axle assembly 32.

The one or more downward-directing airfoils 34 are similar to the inward and outward-directing airfoils 36, but rotated to a transverse orientation relative to the inward and outward-directing airfoils 36. Again, the concave air-deflecting surface 55 of each downward directing airfoil 34 gradually curves to an extent that a portion of the air-deflecting surface 55 immediately adjacent to the trailing edge 59 forms a suitable angle relative to the longitudinal axis 38 of the trailer 20 to direct the desired portion of the airflow in the downward direction to clear the portions of the axle assembly 32.

The concave air-deflecting surfaces 55, 61, 65 can each independently have any radius of curvature to suitably direct the portions of the airflow and minimize aerodynamic drag experienced by the vehicle 10 while underway. For example, illustrative embodiments include at least one, and optionally a plurality of, or all of the concave air-deflecting surfaces 55, 61, 65 including a radius of curvature that is less than or equal to about forty (40") inches, down to a radius of curvature that is about twelve (12") inches. According to other embodiments, the radius of curvature of one, a plurality of, or all of the concave air-deflecting surfaces 55, 61, 65 is approximately 24 inches. But regardless of the radius of curvature, the horizontal and vertical airfoils 34, 36 are substantially shorter than the length of the trailer 20, and do not extend along a significant extent of the longitudinal axis 38. For example, the width $Y_t$ of a support frame 46 discussed in detail below is also considered to be substantially shorter than the length of the trailer 20 along longitudinal axis 38.

According to embodiments of the air manipulator assembly 12, the vertical airfoils 36, when installed on the trailer 20, extend less than 72 inches along the longitudinal axis 38 of the trailer 20. In other words, the leading edge 57 and trailing edge 59 of the vertical airfoils 36 are separated from each other by less than 24 inches in a direction parallel to the longitudinal axis 38, a dimension that is similar to the width $Y_t$ of a support frame 46 (FIG. 11). The distance in a horizontal plane parallel to the ground 19 along the longitudinal axis 38 that the vertical airfoils 36 extend between their leading and trailing edges 57, 59 will be referred to herein as a width $Y_{AF}$ of those airfoils 36, and is illustrated in FIGS. 11 and 13, discussed below. According to alternate embodiments, the vertical airfoils 36, when installed on the trailer 20, extend less than 24 inches along the longitudinal axis 38 of the trailer 20. For yet other embodiments, the width $Y_t$ of the support frame 46 can be selected to allow a desired clearance beyond both the leading and trailing edges 57, 59. For example, the width $Y_t$ (FIG. 11) of the support frame 46 can be selected to be equal to the length along the longitudinal axis 38 separating the leading and trailing edges 57, 59, plus about one (1") to five (5") beyond each of the leading edge 57 and the trailing edge 59. In other words, the width $Y_t$ can be equal to $Y_{AF}$+one to five (1-5") inches. As such, the vertical airfoils 36 are compact, and do not extend a significant distance along the longitudinal axis 38 of the trailer between the trailer axle assembly 32 and a rearward end 27 (FIG. 3) of the tractor 14. According to yet other embodiments the vertical airfoils extend less than 15 inches along the longitudinal axis 38 of the trailer 20, and even less than 10 inches along the longitudinal axis 38 of the trailer 20. By minimizing the extent along which the vertical airfoils 36 extend along the length of the longitudinal axis 38 material costs can be minimized.

Figure 7:
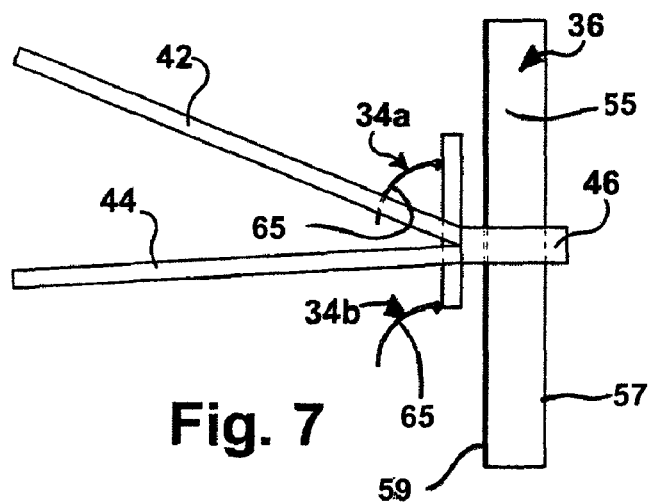
FIG. 7 is a side view of the air manipulator assembly constructed in FIG. 6.
Figure 8:
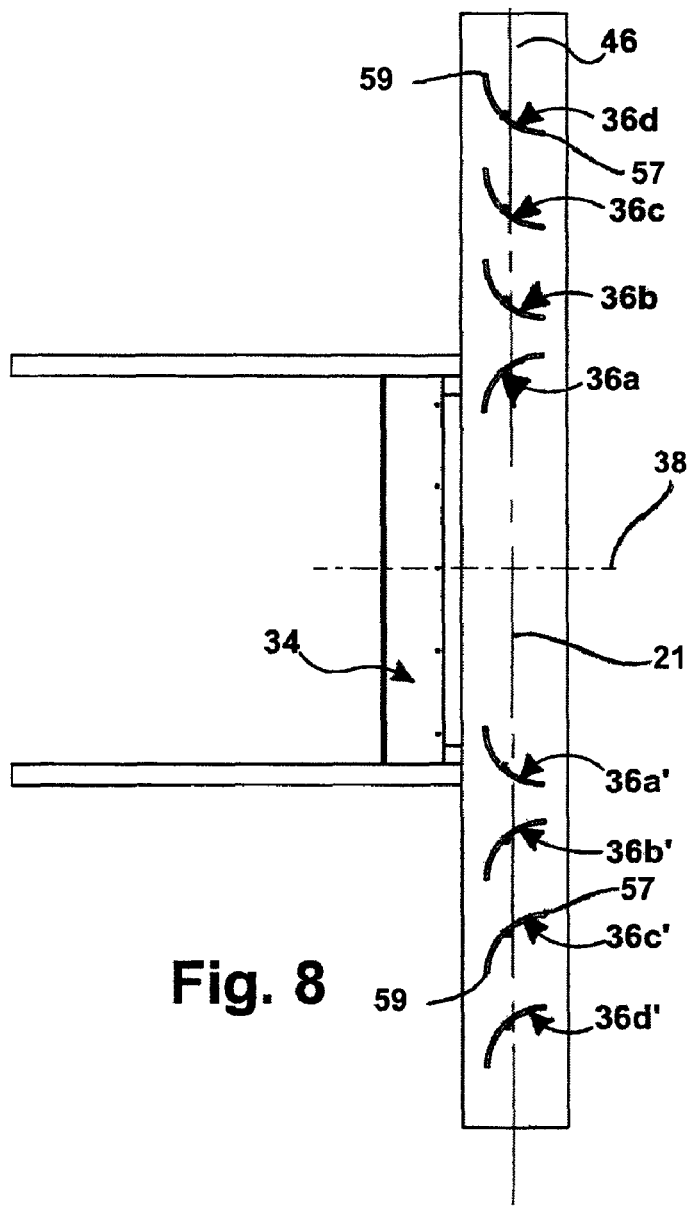
FIG. 8 is a top view of the air manipulator assembly constructed in FIG. 6.

A support rail 46 provided to the frame 47 acts as a holding fixture for the respective vertical airfoils 36, as best seen in FIGS. 6-8. The vertical airfoils 36 can extend to any desired extent above or below the support rail 46. In the illustrated example embodiment of FIGS. 6-8, the vertical airfoils 36 are centrally positioned within the support rail. The upper arms 42 and lower arms 44 are attached at their ends opposite the bogie 40 to the support rail 46 by conventional connecting means, such as fasteners (not shown) or support welds.

The support rail 46 holds multiple vertical airfoils 36 mounted in side-by-side orientation separated by a distance that allows unimpeded airflow with the number of vertical airfoils determined by the spatial coverage required. Further, for the embodiments having a vertical airfoil 36 with a concave outward air-deflecting surface 55, the laterally outermost vertical airfoil 36a, 36a' at each lateral end of the air manipulator assembly 12 can be arranged to be recessed laterally inward of the sides of the trailer 20. In other words, when the air manipulator assembly 12 is coupled to the trailer 20, the trailing edge 59 of each laterally outermost vertical airfoils 36a, 36a' is a predetermined distance "D" (FIG. 5) closer to the longitudinal axis 38 than an externally exposed side 29 (FIG. 1) of the trailer 20 at a corresponding location along the longitudinal axis 38. According to embodiments of the air manipulator assembly 12, the predetermined distance D to which the trailing edge 59 of the outermost vertical airfoils 36a, 36a' is recessed can be at least two (2") inches, at least four (4") inches, at least six (6") inches, at least eight (8") inches, or any other suitable distance to minimize aerodynamic drag experienced by the vehicle 10 while underway.

Figure 9:
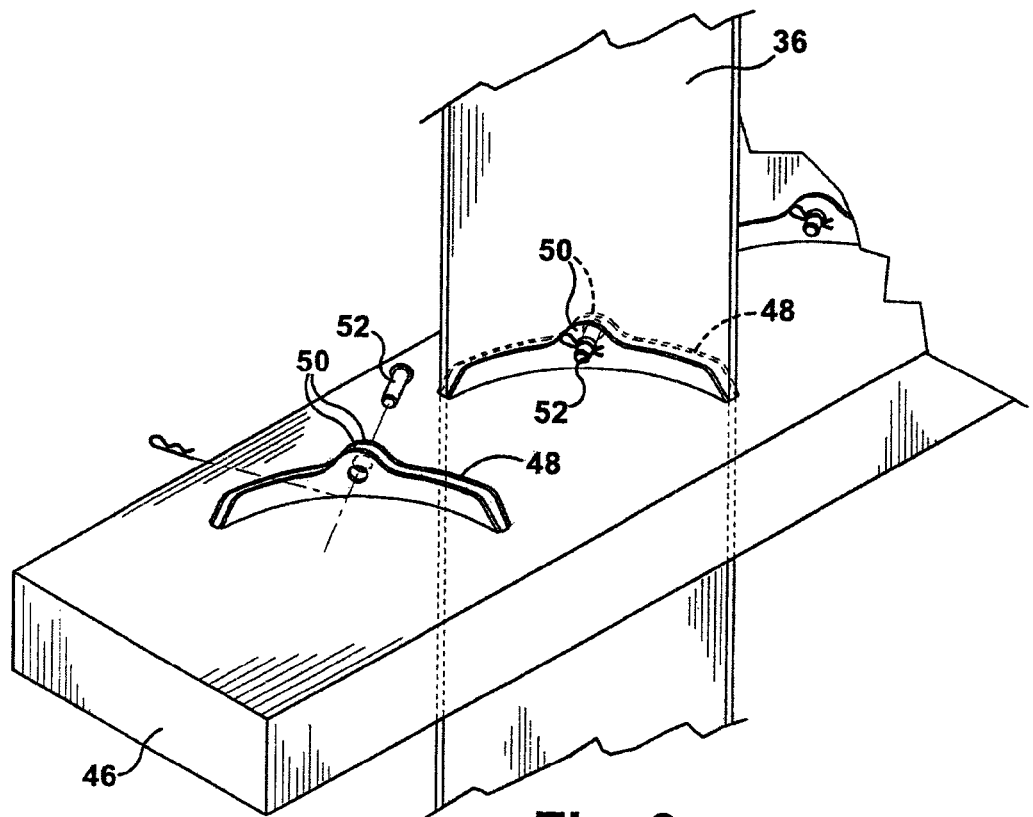
FIG. 9 is a partially sectioned assembly view of one embodiment of the air manipulator assembly.
Figure 10:
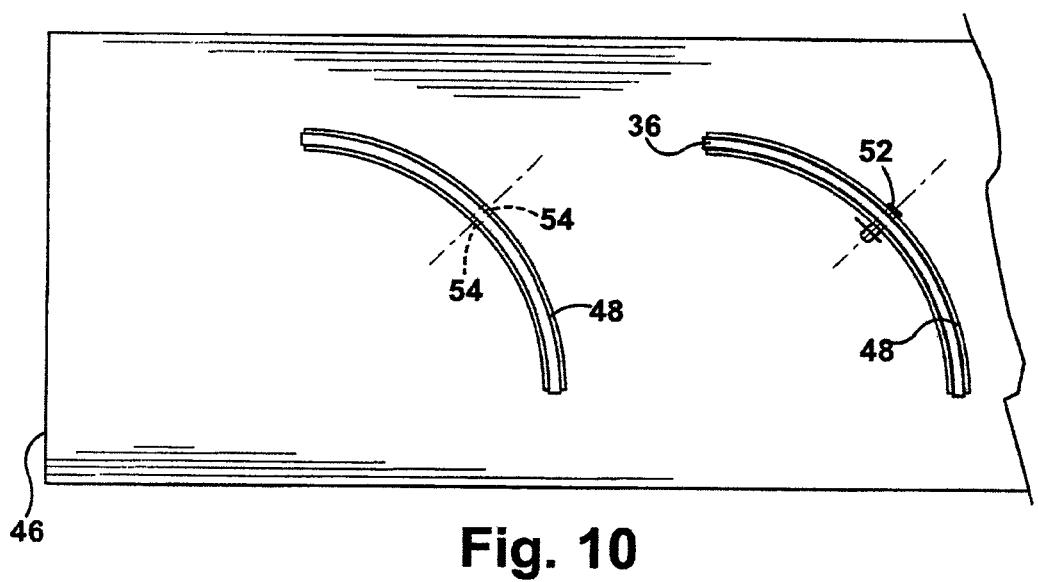
FIG. 10 is a top view of the sectioned assembly embodiment illustrated in FIG. 9.

The support rail 46 can be made from aluminum flat stock or steel flat sheet stock, having a corresponding punched arc 48 that forms an alignment tab 50 for each corresponding vertical airfoil 36, as illustrated in FIGS. 9 and 10. Once the punched arcs 48 and alignment tabs 50 are formed by a punching operation, the sheet stock is pressed, folded, or roll formed into a rigid rectangular cross section. Alternatively, the support rail 46 is made from box tubing having the corresponding arcs 48 punched or plasma cut through the tubing for receiving the corresponding vertical airfoil 36.

FIG. 9 illustrates a perspective partial sectional view of the support rail 46 depicting a single vertical airfoil 36 residing between corresponding arcs 48. The vertical airfoils 36 are locked into position by a fastener 52 such as a cotter pin and stud that passes through a plurality of aligned holes 54 coinciding in the vertical airfoils 36 and alignment tabs 50. The fasteners 52 allow for easy replacement and assembly of each vertical airfoil 36 into the support rail 46. In addition, the fasteners and construction of the vertical airfoils 36 with the support rail 46 provides a modular design such that the vertical airfoils are placed individually for location optimization that can be customized for each application.

FIG. 11 illustrates one example embodiment of the support rail having a prescribed number of locations for supporting vertical airfoils 36. However, it is to be noted that the manipulator assembly 12 can have any number of airfoils 34, 36 and any variation of location of the vertical airfoils 36 along the support rail 46 without departing from the spirit and scope of the claimed invention.

In the example embodiment of FIG. 11, the overall height and length dimensions of the support rail are approximately $Z_t$=three (3") inches and $X_t$=ninety-six (96") inches, respectively while the distance between the outer end arcs and the end of the support rail 46 represented by $X_1$ can be approximately two (2") inches. Thus, when the support rail 46 is coupled to the trailer 20, the dimension $Y_t$ extends along, and substantially parallel to the longitudinal axis 38. The spacing between each outer arcs 48 represented by $X_2$ is approximately eight (8") inches, each of the arc having an approximate opening represented by $t_1$ of one (1") inch. The distance between the outer arc and inner arc represented by $X_3$ is approximately one (1") inch and the internal distances between the inner arcs represented by $X_4$ and $X_5$ being approximately twenty-six (26") inches and forty-two (42") inches, respectively. The distance between the outermost arcs and ends of the support rail 46 represented by $X_6$ being approximately ten (10") inches.

In the illustrated embodiment of FIG. 11, the converging of the dimensions $X_4$ and $X_5$ from forty-two (42") inches to twenty-six (26") inches allows the horizontal airfoils 34 to fully manipulate the inner airflow such that it passes under the lateral axis 39 of the trailer 20 and the axle assembly components C, since the overall dimension of the horizontal airfoils is greater than the exit opening $X_4$. In the illustrated embodiment of FIG. 11, the horizontal 34 and vertical 36 airfoils are approximately thirty-six (36") in length.

Referring now to FIG. 12, an airfoil 56 is shown in a flat orientation prior to being shaped into either a horizontal 34 or vertical 36 airfoil. In one example embodiment, the airfoil 56 is made from EPDM material having an approximate durometer reading of between 85-95 on a Shore A scale. In its flat orientation, the airfoil 56 has a length represented by $X_1$ of approximately thirty-six (36") inches and a width represented by $Y_1$ falling within a range from about twenty (20") inches to about forty (40") inches. According to an illustrative embodiment, the width Y1 of the flat airfoil 56 can be about thirty five (35") inches, and have a relative thickness represented by $t_1$ of approximately one-quarter of one inch (0.25").

In order to construct the horizontal and vertical airfoils, 34, 36, respectively from the airfoil 56, heat is applied as the airfoils 34, 36 are extruded to give the airfoils 34, 36 their arcuate shapes as illustrated in FIG. 13. For example, heat at a temperature of approximately three-hundred degrees Fahrenheit (300° F.) is applied, and the airfoils 34, 36 can be extruded through an aperture having a radius of curvature similar to the finished airfoil 34, 36, as represented by $R_1$ in FIG. 13. As described above, the radius of curvature can be any value that suitably directs the portions of the airflow to minimize aerodynamic drag experienced by the vehicle 10 while underway. For example, illustrative embodiments include at least one, and optionally a plurality of, or all of the concave air-deflecting surfaces 55, 61, 65 including a radius of curvature that is less than or equal to about forty (40") inches, down to a radius of curvature that is about twelve (12") inches. According to other embodiments, the radius of curvature of one, a plurality of, or all of the concave air-deflecting surfaces 55, 61, 65 is approximately 24 inches. The airfoils 34, 36 are allowed to cool in their arcuate shapes following extrusion.

Figure 14:
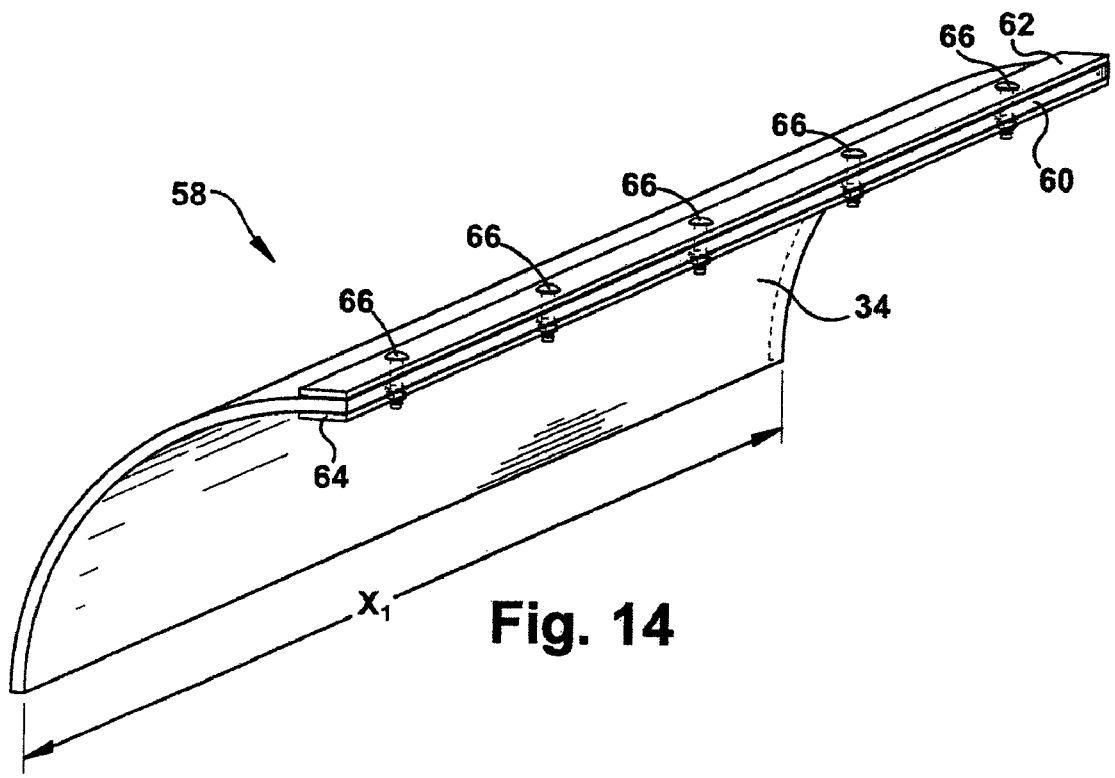
FIG. 14 is a perspective view of one embodiment of a horizontal airfoil arrangement of the manipulator assembly.
Figure 15:
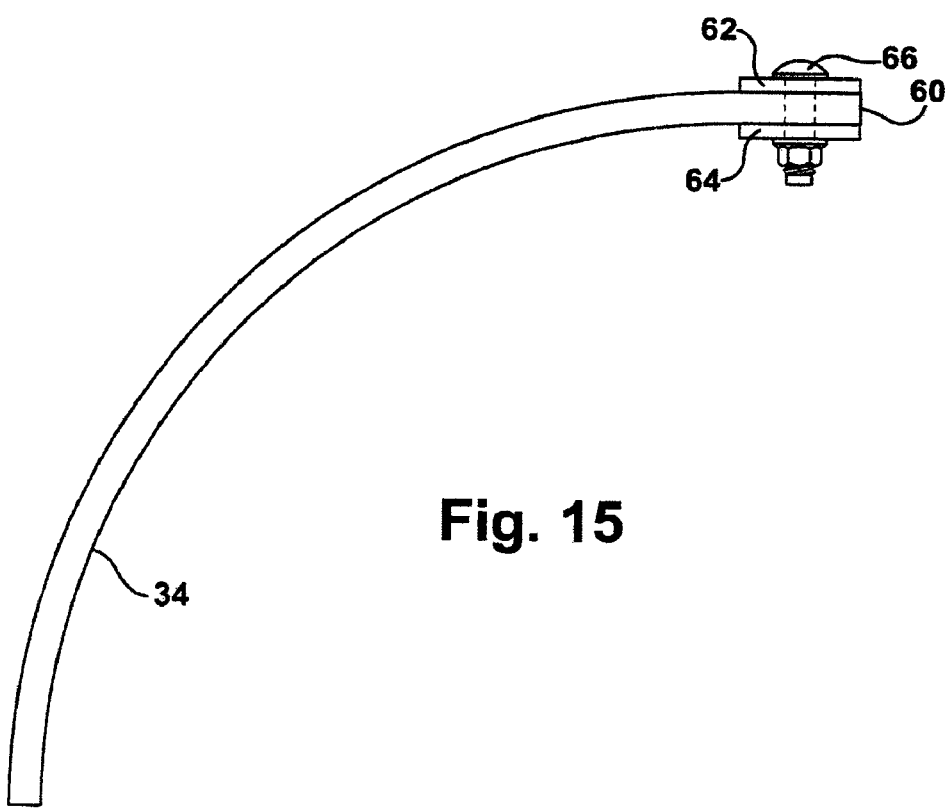
FIG. 15 is an end view of the horizontal airfoil arrangement of FIG. 14.

FIGS. 14 and 15 in combination with FIG. 6, illustrate one example embodiment of an attachment assembly 58 of the horizontal airfoil 34 being connected to the manipulator assembly 12. The attachment assembly 58 comprises an attachment end 60 of the horizontal airfoil 34, which is sandwiched between a two (2") inches by two (2") inches by one-eighth (⅛") inch by thirty-six (36") inch steel box tube 62 and a piece of 11 Ga steel flat stock 64 approximately thirty-six (36") inches in length. The attachment assembly 58 secures the attachment end 60 between the box tube 62 and flat stock 64 through a plurality of fasteners 66, such as a bolt, nut and washer combination. The box tube 62 is attached via fasteners 66 to upright box tubes 68 (see FIG. 6) that are secured by fasteners or welds to the support rail 46.

Figure 16:
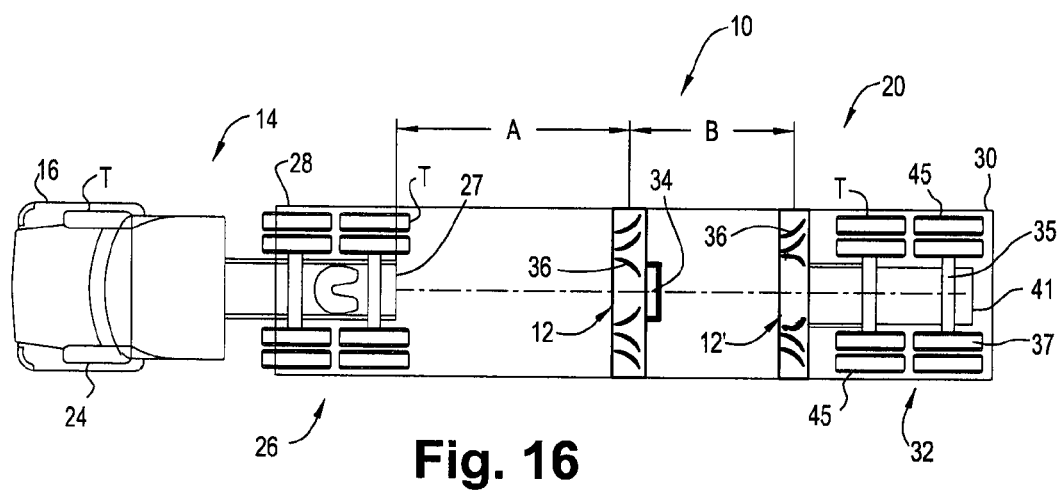
FIG. 16 is a bottom view of an over-the-road vehicle including a plurality of air manipulator assemblies.

FIG. 16 illustrates another embodiment of an air manipulator assembly 12 supported on a trailer 20 to minimize aerodynamic drag experienced by the vehicle 10 while underway. As shown in FIG. 16, a pair of air manipulator assemblies 12, 12' such as those described above are coupled to the trailer 20, each including a vertical airfoil 36 to direct portions of the airflow generally inward, generally outward, or generally inward and generally outward. Each air manipulator assembly 12, 12' can optionally also include one or more horizontal airfoils 34 to direct a portion of the airflow in a generally downward direction.

Similar to the embodiment shown in FIG. 3, a forward air manipulator assembly 12 is suspended from the trailer 20 at a location separated from a rearward end 27 of the tractor 14 by the predetermined distance A along a longitudinal axis 38 of the trailer 20. Again, the predetermined distance A can be chosen to minimize the aerodynamic drag experienced by the vehicle 10 while underway for the particular vehicle 10 configuration. However, according to embodiments where the vehicle 10 is configured as a tractor-trailer arrangement as shown in FIG. 16, where the trailer 20 can be approximately fifty three (53') feet in length, for example, the predetermined distance A can be approximately seventeen feet, eight inches (17'8") separating the central axis 21 of the vertical airfoils 36 from the rearward end 27 of the tractor 14. According to other embodiments, the predetermined distance A can be within two (2') feet of seventeen feet, eight inches (17'8") (i.e., 17 ft. 8 inches±2 ft.). According to yet other embodiments, the predetermined distance A can be within two (1') foot of seventeen feet, eight inches (17'8") (i.e., 17 ft. 8 inches±1 ft.).

In addition to the forward air manipulator assembly 12, the embodiment shown in FIG. 16 also includes an aft air manipulator assembly 12'. The aft air manipulator assembly 12' can likewise be separated from the forward air manipulator assembly 12 by a predetermined distance B, which is the distance from the central axis 21 (FIG. 8) of the forward air manipulator assembly 12 to a similar central axis 21 of the aft air manipulator assembly 12' along the longitudinal axis 38.

The predetermined distance B can be chosen for the particular vehicle configuration to minimize the aerodynamic drag experienced by that vehicle 10 while underway. However, according to embodiments where the vehicle 10 is configured as a tractor-trailer arrangement as shown in FIG. 16, where the trailer 20 can be approximately fifty three (53') feet in length, for example, the predetermined distance B can be approximately seventeen feet, eight inches (17'8"). According to other embodiments, the predetermined distance B can be within two (2') feet of seventeen feet, eight inches (17'8") (i.e., 17 ft. 8 inches±2 ft.). According to yet other embodiments, the predetermined distance B can be within two (1') foot of seventeen feet, eight inches (17'8") (i.e., 17 ft. 8 inches±1 ft.).

Figure 17:
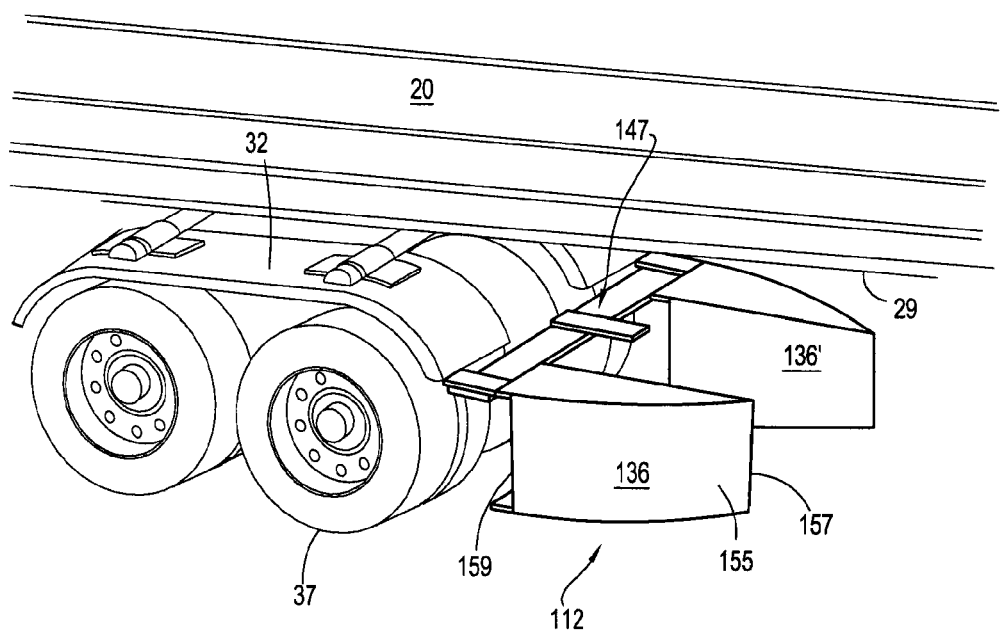
FIG. 17 is a perspective view of an embodiment of an air manipulator assembly coupled to a trailer.

FIG. 17 illustrates another embodiment of an air manipulator assembly 12 supported on a trailer 20 to minimize aerodynamic drag experienced by the vehicle 10 while underway. As shown in FIG. 17, the air manipulator assembly 112 includes a pair of vertical airfoils 136, 136' supported immediately upwind of the trailer axle assembly 32 by a frame 147. Each of the vertical airfoils 136, 136' includes an arcuate, convex outward air-deflecting surface 155. The convex outward air-deflecting surface 155 of each vertical airfoil 136, 136' begins at a leading edge 157, and gradually extends further away from the longitudinal axis 38 of the trailer 20 as it advances toward a trailing edge 159. But being convex outward, the rate at which the convex outward air-deflecting surface 155 extends away from the longitudinal axis 38 decreases as it approaches the trailing edge 159. The convex outward air-deflecting surface 155 can optionally also include a substantially planar portion downwind of the arcuate portion, wherein the optional planar portion can progressively approach an orientation substantially parallel to the longitudinal axis 38 when approaching the trailing edge 159 from the leading edge 157. The vertical airfoils 136, 136' can each extend any suitable length along the longitudinal axis 38 of the trailer 20, such as about two (2') to four (4') feet, for example. And also like the previously discussed embodiments and the embodiments discussed below with respect to FIG. 19, the leading edges 157 of the vertical airfoils 136, 136' are spaced laterally apart to define an aperture there between through which a portion of the airflow can pass while the vehicle 10 is underway.

The convex outward air-deflecting surface 155 can include an arcuate portion with a radius of curvature of about 48 (48") inches, or any other suitable radius of curvature. Further, the arcuate convex outward air-deflecting surface 155 can optionally extend out to the same lateral distance from the longitudinal axis 38 as the externally exposed side 29 of the trailer 20. In other words, the convex outward air-deflecting surface 155 can be approximately flush with the externally exposed side 29 of the trailer 20.

Figure 18:
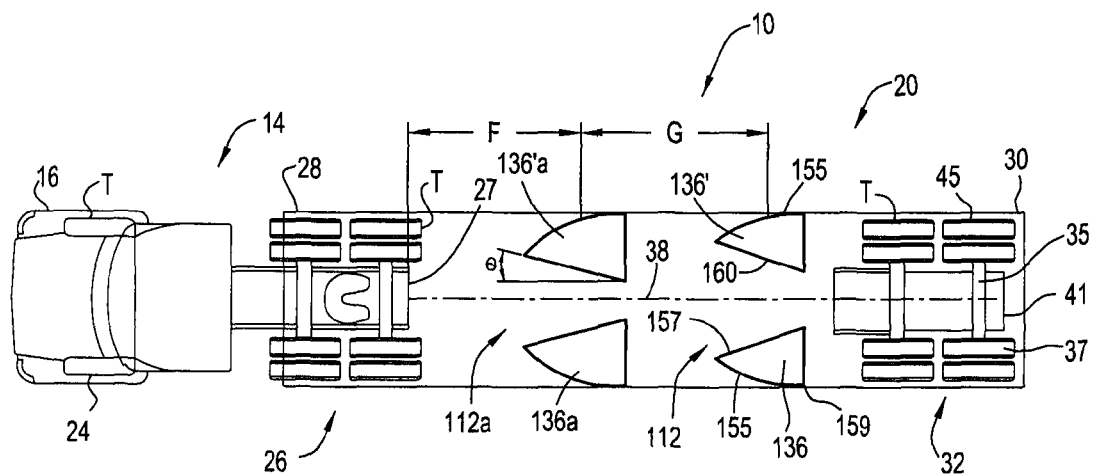
FIG. 18 is a bottom view of an over-the-road vehicle including a plurality of air manipulator assemblies.

FIG. 18 illustrates a bottom view of fore and aft air manipulator assemblies 112a, 112. In addition to the convex outward air-deflecting surface 155, each vertical airfoil 136, 136', 136a, 136a' can optionally include an interior tapered surface 160. The interior tapered surface 160 can optionally be flat, convex or concave as desired. For embodiments including a substantially flat interior tapered surface 160, the flat interior tapered surface 160 can form an angle θ relative to the longitudinal axis 38, wherein the angle θ can be any suitable angle to direct at least a portion of the airflow in a generally inward direction toward the central axis 38. For example, the angle θ can be about zero (0°) degrees (i.e., parallel to the longitudinal axis 38), or can be any suitable angle within a range from about one (1°) degree to about three (3°) degrees, and any individual angle and subrange falling within that range. Thus the angle θ can be about one (1°) degree, about two (2°) degrees, or about three (3°) degrees according to various embodiments. According to other embodiments, the angle θ can be as large as about five (5°) degrees. The generally inwardly directed portion of the airflow can pass between laterally opposed components of the axle assembly 32 such as the tire(s) 37 supported at each lateral end of the axle 35.

Similar to FIG. 16, FIG. 18 illustrates an embodiment including a plurality of air manipulator assemblies 112 coupled to a trailer 20 to minimize aerodynamic drag experienced by the vehicle 10 while underway. The trailer 20 can optionally include only the fore air manipulator assembly 112a, only the aft air manipulator assembly 112, or a plurality such as both the fore and aft air manipulator assemblies 112a, 112. In either instance, the airfoils provided to the fore and aft air manipulator assemblies 112a, 112, as well as the airfoils provided to the multiple air manipulator assembly embodiments described elsewhere herein can be substantially identical to each other.

As shown in FIG. 18, the pair of air manipulator assemblies 112, 112a such as those described with respect to and shown in FIG. 17, are coupled to the trailer 20, each including a vertical airfoils 136 and 136' to direct portions of the airflow generally inward, generally outward, or generally inward and generally outward. Similar to the embodiment shown in FIG. 3, the fore air manipulator assembly 112a is suspended from the trailer 20 at a location separated from a rearward end 27 of the tractor 14 by a predetermined distance F along a longitudinal axis 38 of the trailer 20. Again, the predetermined distance F can be chosen for the particular vehicle configuration to minimize the aerodynamic drag experienced by that particular vehicle 10 while underway. However, according to embodiments where the vehicle 10 is configured as a tractor-trailer arrangement as shown in FIG. 18, where the trailer 20 can be approximately fifty three (53') feet in length, for example, the predetermined distance F can be approximately seventeen feet, eight inches (17'8") separating a midpoint of the vertical airfoils 136a, 136a' from the rearward end 27 of the tractor 14. According to other embodiments, the predetermined distance F can be within two (2') feet of seventeen feet, eight inches (17'8") (i.e., 17 ft. 8 inches±2 ft.). According to yet other embodiments, the predetermined distance F can be within two (1') foot of seventeen feet, eight inches (17'8") (i.e., 17 ft. 8 inches±1 ft.).

In addition to the fore air manipulator assembly 112a, the embodiment shown in FIG. 18 also includes the aft air manipulator assembly 112. The aft air manipulator assembly 112 can likewise be separated from the fore air manipulator assembly 112a by a predetermined distance G, which is the distance from midpoint of the airfoils 136a, 136a' of the fore air manipulator assembly 112a to a midpoint of the vertical airfoils 136, 136' of the aft air manipulator assembly 112, respectively, along the longitudinal axis 38.

The predetermined distance G can be chosen for the particular vehicle configuration to minimize the aerodynamic drag experienced by that vehicle 10 while underway. However, according to embodiments where the vehicle 10 is configured as a tractor-trailer arrangement as shown in FIG. 18, where the trailer 20 can be approximately fifty three (53') feet in length, for example, the predetermined distance G can be approximately seventeen feet, eight inches (17'8"). According to other embodiments, the predetermined distance G can be within two (2') feet of seventeen feet, eight inches (17'8") (i.e., 17 ft. 8 inches±2 ft.). According to yet other embodiments, the predetermined distance G can be within two (1') foot of seventeen feet, eight inches (17'8") (i.e., 17 ft. 8 inches±1 ft.).

Figure 19:
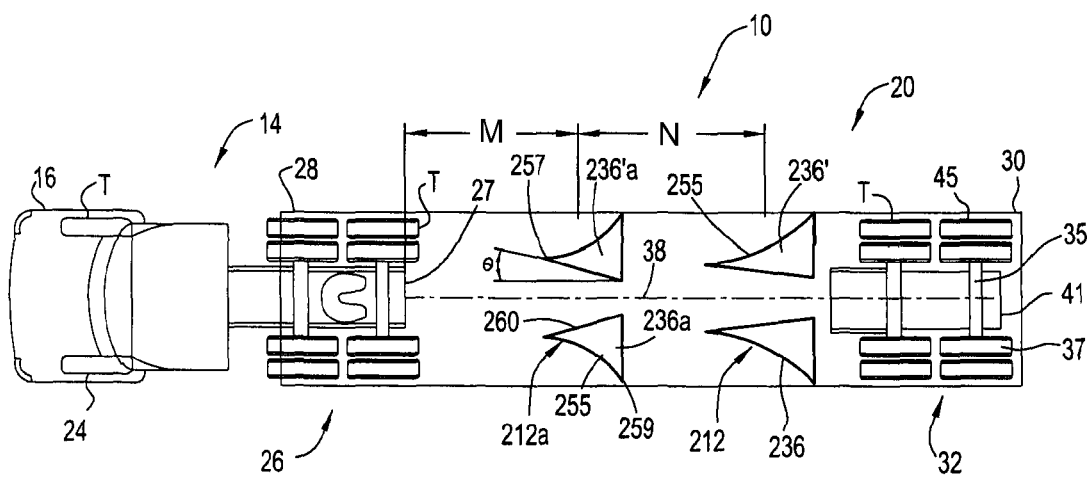
FIG. 19 is a bottom view of an over-the-road vehicle including a plurality of air manipulator assemblies.

FIG. 19 depicts another illustrative embodiment of a trailer 20 comprising fore and aft air manipulator assemblies 212a, 212. As shown in FIG. 19, the fore air manipulator assembly 212a includes a pair of vertical airfoils 236a and 236a' coupled to the trailer 20 by frames such as the frame 147 shown in FIG. 17. Each of the vertical airfoils 236, 236', 236a, 236a' (collectively referred to as vertical airfoils 236) includes an arcuate, concave outward air-deflecting surface 255, similar to the concave outward air-deflecting surface 55 described above with regard to FIGS. 1-15. The convex outward air-deflecting surface 255 of each vertical airfoil 236 begins at a leading edge 257, and gradually extends further away from the longitudinal axis 38 of the trailer 20 as it advances toward a trailing edge 259. Unlike the convex outward air-deflecting surface 155, however, the rate at which the concave outward air-deflecting surface 255 extends away from the longitudinal axis 38 increases as it approaches the trailing edge 259. The vertical airfoils 236 can each extend any suitable length along the longitudinal axis 38 of the trailer 20, such as about two (2') to about four (4') feet, for example, but not a significant length of the longitudinal axis 38.

The concave outward air-deflecting surface 255 can include an arcuate portion with a radius of curvature of about 48 (48") inches, or any other suitable radius of curvature. Further, the arcuate concave outward air-deflecting surface 255 can optionally extend out the same lateral extent from the longitudinal axis 38 as the externally exposed side 29 of the trailer 20. In other words, the trailing edge 259 of the concave outward air-deflecting surface 255 can be approximately flush with the externally exposed side 29 of the trailer 20.

In addition to the concave outward air-deflecting surface 255, each vertical airfoil 236 can optionally include an interior tapered surface 260. The interior tapered surface 260 can optionally be flat, convex or concave as desired. For embodiments including a substantially flat interior tapered surface 260, the flat interior tapered surface 260 can form an angle θ relative to the longitudinal axis 38, wherein the angle θ can be any suitable angle to direct at least a portion of the airflow in a generally inward direction toward the central axis 38. For example, the angle θ can be about 0° (i.e., parallel to the longitudinal axis 38), or can be any suitable angle within a range from about one (1°) degree to about three (3°) degrees, and any individual angle and subrange falling within that range. Thus, the angle θ can be about one (1°) degree, about two (2°) degrees, or about three (3°) degrees according to various embodiments. According to other embodiments, the angle θ can be as large as about five (5°) degrees. The generally inwardly directed portion of the airflow can pass between laterally opposed components of the axle assembly 32 such as the tire(s) 37 supported at each lateral end of the axle 35.

Similar to FIG. 16, FIG. 19 illustrates an embodiment including a plurality of air manipulator assemblies 212, 212a coupled to the trailer 20 to minimize aerodynamic drag experienced by the vehicle 10 while underway. The trailer 20 can optionally include only the fore air manipulator assembly 212a, only the aft air manipulator assembly 212, or a plurality such as both the fore and aft air manipulator assemblies 212a, 212.

The pair of air manipulator assemblies 212, 212a are coupled to the trailer 20 to direct portions of the airflow generally inward, generally outward, or generally inward and generally outward. Similar to the embodiment shown in FIG. 3, the fore air manipulator assembly 212a is suspended from the trailer 20 at a location separated from a rearward end 27 of the tractor 14 by a predetermined distance M along a longitudinal axis 38 of the trailer 20. Again, the predetermined distance M can be chosen for the particular vehicle configuration to minimize the aerodynamic drag experienced by that particular vehicle 10 while underway. However, according to embodiments where the vehicle 10 is configured as a tractor-trailer arrangement as shown in FIG. 19, where the trailer 20 can be approximately fifty three (53') feet in length, for example, the predetermined distance M can be approximately seventeen feet, eight inches (17'8") separating a midpoint of the vertical airfoils 236a, 236a' from the rearward end 27 of the tractor 14. According to other embodiments, the predetermined distance M can be within two (2') feet of seventeen feet, eight inches (17'8") (i.e., 17 ft. 8 inches±2 ft.). According to yet other embodiments, the predetermined distance M can be within two (1') foot of seventeen feet, eight inches (17'8") (i.e., 17 ft. 8 inches±1 ft.).

In addition to the fore air manipulator assembly 212a, the embodiment shown in FIG. 19 also includes the aft air manipulator assembly 212. The aft air manipulator assembly 212 can likewise be separated from the fore air manipulator assembly 212a by a predetermined distance N, which is the distance from midpoint of the airfoils 236a, 236a' of the fore air manipulator assembly 212a to a midpoint of the vertical airfoils 236, 236' of the aft air manipulator assembly 212, respectively, along the longitudinal axis 38.

The predetermined distance N can be chosen for the particular vehicle configuration to minimize the aerodynamic drag experienced by that vehicle 10 while underway. However, according to embodiments where the vehicle 10 is configured as a tractor-trailer arrangement as shown in FIG. 19, where the trailer 20 can be approximately fifty three (53') feet in length, for example, the predetermined distance N can be approximately seventeen feet, eight inches (17'8"). According to other embodiments, the predetermined distance N can be within two (2') feet of seventeen feet, eight inches (17'8") (i.e., 17 ft. 8 inches±2 ft.). According to yet other embodiments, the predetermined distance N can be within two (1') foot of seventeen feet, eight inches (17'8") (i.e., 17 ft. 8 inches±1 ft.).

While the illustrative embodiments of FIGS. 1-5 depict the air manipulator assembly 12 being coupled immediately upwind of the trailer axle assembly 32, it could optionally be used at a forward or rearward position with respect to the front 24 or rear 26 axle assemblies of the tractor 14, or both without departing from the spirit and scope of the claimed invention. Stated another way, the manipulator assembly 12 may be placed in front or behind drag inducing components of an over-the-road vehicle 10 to reduce turbulence in the air streams following drag inducing components and thereby create additional beneficial laminar air flow. It is also to be stated that although the over-the-road vehicle 10 using the air manipulator assembly 12 is illustrated as being a tractor-trailer combination, the manipulator assembly could equally be used on cube trucks, box trucks, recreational vehicles, automobiles, recreational travel trailers, fifth wheel trailers, and the like.

Described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An apparatus for reducing aerodynamic drag experienced by an over-the-road vehicle while underway comprising:
   a frame assembly comprising a fastening fixture for coupling the apparatus to the vehicle;
   a first airfoil to be coupled to said frame assembly in a position forward of a first tire of an axle assembly provided to the vehicle to be exposed to an airflow directed toward the first tire while the vehicle is underway, wherein
   the first airfoil comprises a first outward air deflecting surface for deflecting a portion of the airflow directed toward the first tire laterally outward beyond an externally exposed side of the first tire, the first air deflecting surface comprising a concave outward portion comprising a radius of curvature greater than about twelve (12") inches that extends between a leading edge to be directed into the airflow and a trailing edge to gradually transition the portions of the airflow directed toward the first tire outward beyond the externally exposed side of the first tire;
   a second airfoil to be coupled to said frame assembly in a position forward of a second tire supported at an opposite lateral side of the axle assembly relative to the first tire to be exposed to an airflow directed toward the second tire while the vehicle is underway, wherein
   the second airfoil comprises a second outward air deflecting surface provided to the second airfoil for deflecting a portion of the airflow directed toward the second tire laterally outward beyond an externally exposed side of the second tire, the second air deflecting surface comprising a concave outward portion comprising a radius of curvature greater than about twelve (12") inches that extends between a leading edge to be directed into the airflow and a trailing edge to gradually transition the portions of the airflow directed toward the second tire outward beyond the externally exposed side of the second tire, and wherein
   the first and second airfoils are spaced laterally apart from each other when coupled to said vehicle by said frame assembly to define an aperture between the first and second airfoils through which at least a portion of the airflow directed toward the axle assembly is to pass while the vehicle is underway; and
   a third airfoil to be coupled to the frame assembly within a path of the portion of the airflow passing through the aperture between the first and second airfoils while the vehicle is underway, wherein the third airfoil comprises an air deflecting surface that deflects at least a portion of the airflow passing through the aperture between the first and second airfoils in a generally downward direction toward a ground surface on which the vehicle travels while underway.

2. The apparatus for reducing aerodynamic drag according to claim 1 further comprising an inward facing surface provided to each of the first and second airfoils for directing a portion of the airflow directed toward the first and second tires in a generally inward direction to pass between the first and second tires disposed on opposite sides of the axle assembly.

3. The apparatus for reducing aerodynamic drag according to claim 2, wherein the inward facing-surface of the first and second airfoils is substantially planar and is oriented at an angle within a range from about zero (0°) degrees to about five (5°) degrees relative to the central longitudinal axis of the trailer.

4. The apparatus for reducing aerodynamic drag according to claim 3, wherein the angle of the inward facing surfaces relative to the central longitudinal axis is about three (3°) degrees.

5. The apparatus for reducing aerodynamic drag according to claim 1, wherein the air deflecting surface of the third airfoil comprises a concave downward surface to gradually transition the path of the portion of the airflow passing between the first and second airfoils to the generally downward direction.

6. The apparatus for reducing aerodynamic drag according to claim 1, wherein the fastening fixture of the frame assembly is adapted to be coupled to a bogie that couples an axle to a trailer provided to the over-the-road vehicle.

7. An over-the-road vehicle comprising:
a tractor;
a trailer operatively coupled to the tractor and comprising a platform for supporting cargo to be transported by the vehicle and a first tire and a second tire supported adjacent opposite sides of the trailer; and
an air manipulator assembly coupled to the vehicle to be supported beneath the platform, reward of the tractor and forward of the first and second tires, for minimizing aerodynamic drag experienced by the vehicle while underway, the air manipulator assembly comprising:
a frame assembly comprising a fastening fixture for coupling the air manipulator assembly to the vehicle;
a first airfoil to be coupled to said frame assembly in a position forward of the first tire provided to the trailer to be exposed to an airflow directed toward the first tire while the vehicle is underway, wherein
the first airfoil comprises a first outward air deflecting surface for deflecting a portion of the airflow directed toward the first tire laterally outward beyond an externally exposed side of the first tire, the first air deflecting surface comprising a concave outward portion comprising a radius of curvature greater than about twelve (12") inches that extends between a leading edge to be directed into the airflow and a trailing edge to transition the portions of the airflow directed toward the first tire outward beyond the externally exposed side of the first tire; and
a second airfoil to be coupled to said frame assembly in a position forward of the second tire provided to the trailer to be exposed to an airflow directed toward the second tire while the vehicle is underway, wherein
the second airfoil comprises a second outward air deflecting surface provided to the second airfoil for deflecting a portion of the airflow directed toward the second tire laterally outward beyond an externally exposed side of the second tire, the second air deflecting surface comprising a concave outward portion comprising a radius of curvature greater than about twelve (12") inches that extends between a leading edge to be directed into the airflow and a trailing edge to transition the portions of the airflow directed toward the second tire outward toward the laterally exposed side of the second tire, wherein
the first and second airfoils are spaced laterally apart from each other when coupled to said vehicle by said frame assembly to define an aperture between the first and second airfoils through which at least a portion of an airflow under the trailer is to pass while the vehicle is underway.

8. The vehicle according to claim 7, wherein the fastening fixture of the frame assembly is adapted to be coupled to a bogie coupling an axle supporting the first and second tires to the trailer.

9. The vehicle according to claim 7 further comprising an inward facing surface provided to each of the first and second airfoils for directing a portion of the airflow directed toward the first and second tires in a generally inward direction to pass between the first and second tires supported adjacent to opposite sides of the trailer.

10. The vehicle according to claim 9, wherein the inward facing-surface of the first and second airfoils is substantially planar and is oriented at an angle within a range from about zero (0°) degrees to about five (5°) degrees relative to a central longitudinal axis of the trailer.

11. The vehicle according to claim 10, wherein the angle of the inward facing surfaces relative to the central longitudinal axis is about three (3°) degrees.

12. The vehicle according to claim 7, wherein the first and second airfoils are to be coupled to the trailer to be supported at a location forward of an axle assembly coupling the first and second tires to the trailer and within two (±2') feet of a distance of about seventeen feet, eight inches (17' 8") behind a rearward end of the tractor along a longitudinal axis of the vehicle.

13. An apparatus for reducing aerodynamic drag experienced by an over-the-road vehicle while underway comprising:
a frame assembly comprising a fastening fixture for coupling the apparatus to the vehicle;
a first airfoil to be coupled to said frame assembly in a position forward of a first tire of an axle assembly provided to the vehicle to be exposed to an airflow directed toward the first tire while the vehicle is underway, wherein
the first airfoil comprises:
a first outward air deflecting surface for deflecting a portion of the airflow directed toward the first tire laterally outward beyond an externally exposed side of the first tire, the first air deflecting surface comprising a concave outward portion that extends between a leading edge to be directed into the airflow and a trailing edge to transition the portions of the airflow directed toward the first tire outward beyond the laterally exposed side of the first tire, and
an inward facing surface that diverges from the first outward air deflecting surface to direct a portion of the airflow directed toward the first tire in a generally inward direction beyond an internally exposed side of the first tire; and
a second airfoil to be coupled to said frame assembly in a position forward of a second tire supported at an opposite lateral side of the axle assembly relative to the first tire to be exposed to an airflow directed toward the second tire while the vehicle is underway, wherein
the second airfoil comprises:
a second outward air deflecting surface provided to the second airfoil for deflecting a portion of the airflow directed toward the second tire laterally outward toward an externally exposed side of the second tire, the second air deflecting surface comprising a concave outward portion that extends between a leading edge to be directed into the airflow and a trailing edge to transition the portions of the airflow directed toward the second tire outward toward the laterally exposed side of the second tire, and
an inward facing surface that diverges from the second outward air deflecting surface to direct a portion of the airflow directed toward the second tire in a generally inward direction beyond an internally exposed side of the second tire, wherein
the first and second airfoils are spaced laterally apart from each other when coupled to said vehicle by said frame assembly to define an aperture between the first and second airfoils through which at least a portion of the airflow directed toward the axle assembly is to pass while the vehicle is underway.

14. An over-the-road vehicle comprising:
a tractor;
a trailer operatively coupled to the tractor and comprising a platform for supporting cargo to be transported by the vehicle and a first tire and a second tire supported adjacent opposite sides of the trailer; and
an air manipulator assembly coupled to the vehicle to be supported beneath the platform, reward of the tractor and forward of the first and second tires, for minimizing aerodynamic drag experienced by the vehicle while underway, the air manipulator assembly comprising:
a frame assembly comprising a fastening fixture for coupling the air manipulator assembly to the vehicle;
a first airfoil to be coupled to said frame assembly in a position forward of the first tire provided to the trailer to be exposed to an airflow directed toward the first tire while the vehicle is underway, wherein
the first airfoil comprises a first outward air deflecting surface for deflecting a portion of the airflow directed toward the first tire laterally outward toward an externally exposed side of the first tire, the first air deflecting surface comprising a concave outward portion that extends between a leading edge to be directed into the airflow and a trailing edge to transition the portions of the airflow directed toward the first tire outward toward the laterally exposed side of the first tire; and
a second airfoil to be coupled to said frame assembly in a position forward of the second tire provided to the trailer to be exposed to an airflow directed toward the second tire while the vehicle is underway, wherein
the second airfoil comprises a second outward air deflecting surface provided to the second airfoil for deflecting a portion of the airflow directed toward the second tire laterally outward toward an externally exposed side of the second tire, the second air deflecting surface comprising a concave outward portion that extends between a leading edge to be directed into the airflow and a trailing edge to transition the portions of the airflow directed toward the second tire outward toward the laterally exposed side of the second tire, wherein
the first and second airfoils are supported by the trailer within two (±2') feet of a distance of about seventeen feet, eight inches (17' 8") behind a rearward end of the tractor along a longitudinal axis of the vehicle and are spaced laterally apart from each other to define an aperture between the first and second airfoils.

15. An apparatus for reducing aerodynamic drag experienced by an over-the-road vehicle while underway comprising:
a frame assembly comprising a fastening fixture for coupling the apparatus to the vehicle;
a first airfoil to be coupled to said frame assembly in a position forward of a first tire of an axle assembly provided to the vehicle to be exposed to an airflow directed toward the first tire while the vehicle is underway, wherein
the first airfoil comprises:
a first outward air deflecting surface for deflecting a portion of the airflow directed toward the first tire laterally outward toward an externally exposed side of the first tire, the first air deflecting surface comprising a concave outward portion that extends between a leading edge to be directed into the airflow and a trailing edge to transition the portions of the airflow directed toward the first tire outward beyond the laterally exposed side of the first tire, and
an inward facing-surface that is substantially planar and oriented at an angle within a range from about zero (0°) degrees to about five (5°) degrees relative to a central longitudinal axis of the trailer for directing a portion of the airflow directed toward the first tire in a generally inward direction;
a second airfoil to be coupled to said frame assembly in a position forward of a second tire supported at an opposite lateral side of the axle assembly relative to the first tire to be exposed to an airflow directed toward the second tire while the vehicle is underway, wherein
the second airfoil comprises:
a second outward air deflecting surface provided to the second airfoil for deflecting a portion of the airflow directed toward the second tire laterally outward toward an externally exposed side of the second tire, the second air deflecting surface comprising a concave outward portion that extends between a leading edge to be directed into the airflow and a trailing edge to transition the portions of the airflow directed toward the second tire outward toward the laterally exposed side of the second tire, and
an inward facing-surface that is substantially planar and oriented at an angle within a range from about zero (0°) degrees to about five (5°) degrees relative to the central longitudinal axis of the trailer for directing a portion of the airflow directed toward the second tire in a generally inward direction, wherein
the first and second airfoils are spaced laterally apart from each other when coupled to said vehicle by said frame assembly to define an aperture between the first and second airfoils through which at least a portion of the airflow directed toward the axle assembly is to pass while the vehicle is underway; and
an inward facing-surface of the first and second airfoils is substantially planar and is oriented at an angle within a range from about zero (0°) degrees to about five (5°) degrees relative to the central longitudinal axis of the trailer.

16. An apparatus for reducing aerodynamic drag experienced by an over-the-road vehicle while underway comprising:
a frame assembly comprising a fastening fixture for coupling the apparatus to the vehicle;
a first airfoil to be coupled to said frame assembly in a position forward of a first tire of an axle assembly provided to the vehicle to be exposed to an airflow directed toward the first tire while the vehicle is underway, wherein
the first airfoil comprises a first outward air deflecting surface for deflecting a portion of the airflow directed toward the first tire laterally outward toward an externally exposed side of the first tire, the first air deflecting surface comprising a concave outward portion that extends between a leading edge to be directed into the airflow and a trailing edge to transition the portions of the airflow directed toward the first tire outward toward the laterally exposed side of the first tire;
a second airfoil to be coupled to said frame assembly in a position forward of a second tire supported at an opposite lateral side of the axle assembly relative to the first tire to be exposed to an airflow directed toward the second tire while the vehicle is underway, wherein the second airfoil comprises a second outward air deflecting surface provided to the second airfoil for deflecting a portion of the airflow directed toward the second tire laterally outward toward an externally exposed side of the second tire, the second air deflecting surface comprising a concave outward portion that extends between a leading edge to be directed into the airflow and a trailing edge to transition the portions of the airflow directed toward the second tire outward toward the laterally exposed side of the second tire, wherein the first and second airfoils are spaced laterally apart from each other when coupled to said vehicle by said frame assembly to define an aperture between the first and second airfoils through which at least a portion of the airflow directed toward the axle assembly is to pass while the vehicle is underway; and a third airfoil to be coupled to the frame assembly within a path of the portion of the airflow passing between the first and second airfoils while the vehicle is underway, the third airfoil comprising an air deflecting surface that deflects at least a portion of the airflow passing between the first and second airfoils in a generally downward direction toward a ground surface on which the vehicle travels while underway.

17. An over-the-road vehicle comprising:

a tractor;

a trailer operatively coupled to the tractor and comprising a platform for supporting cargo to be transported by the vehicle and a first tire and a second tire supported adjacent opposite sides of the trailer; and an air manipulator assembly coupled to the vehicle to be supported beneath the platform, reward of the tractor and forward of the first and second tires, for minimizing aerodynamic drag experienced by the vehicle while underway, the air manipulator assembly comprising:

a frame assembly comprising a fastening fixture for coupling the air manipulator assembly to the vehicle;

a first airfoil to be coupled to said frame assembly in a position forward of the first tire provided to the trailer to be exposed to an airflow directed toward the first tire while the vehicle is underway, wherein the first airfoil comprises a first outward air deflecting surface for deflecting a portion of the airflow directed toward the first tire laterally outward toward an externally exposed side of the first tire, the first air deflecting surface comprising a concave outward portion that extends between a leading edge to be directed into the airflow and a trailing edge to transition the portions of the airflow directed toward the first tire outward toward the laterally exposed side of the first tire;

a second airfoil to be coupled to said frame assembly in a position forward of the second tire provided to the trailer to be exposed to an airflow directed toward the second tire while the vehicle is underway, wherein the second airfoil comprises a second outward air deflecting surface provided to the second airfoil for deflecting a portion of the airflow directed toward the second tire laterally outward toward an externally exposed side of the second tire, the second air deflecting surface comprising a concave outward portion that extends between a leading edge to be directed into the airflow and a trailing edge to transition the portions of the airflow directed toward the second tire outward toward the laterally exposed side of the second tire, wherein the first and second airfoils are spaced laterally apart from each other when coupled to said vehicle by said frame assembly to define an aperture between the first and second airfoils through which at least a portion of an airflow under the trailer is to pass while the vehicle is underway; and an inward facing surface provided to each of the first and second airfoils for directing a portion of the airflow directed toward the first and second tires in a generally inward direction between the first and second tires supported adjacent to opposite sides of the trailer, wherein the inward facing surface of the first and second airfoils is substantially planar and is oriented at an angle within a range from about zero (0°) degrees to about five (5°) degrees relative to a central longitudinal axis of the trailer.

\* \* \* \* \*